US010574329B2

(12) United States Patent
Nagaraja et al.

(10) Patent No.: US 10,574,329 B2
(45) Date of Patent: Feb. 25, 2020

(54) RADIO LINK FAILURE TIMERS AND CONSTANTS BASED ON RADIO LINK MANAGEMENT AND BEAM FAILURE RECOVERY PROCEDURES

(71) Applicant: QUALCOMM Incorporated, San Diego, CA (US)

(72) Inventors: Sumeeth Nagaraja, San Diego, CA (US); Tao Luo, San Diego, CA (US); Wooseok Nam, San Diego, CA (US); Xiao Feng Wang, San Diego, CA (US); Makesh Pravin John Wilson, San Diego, CA (US); Kaushik Chakraborty, San Diego, CA (US); Juan Montojo, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/047,842

(22) Filed: Jul. 27, 2018

(65) Prior Publication Data
US 2019/0036590 A1 Jan. 31, 2019

Related U.S. Application Data

(60) Provisional application No. 62/538,603, filed on Jul. 28, 2017.

(51) Int. Cl.
*H04W 76/19* (2018.01)
*H04B 7/08* (2006.01)
(Continued)

(52) U.S. Cl.
CPC ............ *H04B 7/088* (2013.01); *H04B 7/0695* (2013.01); *H04B 17/17* (2015.01); *H04B 17/309* (2015.01);
(Continued)

(58) Field of Classification Search
CPC .... H04B 7/0695; H04B 7/088; H04B 17/309; H04B 17/17; H04B 17/0417;
(Continued)

(56) References Cited

U.S. PATENT DOCUMENTS

2017/0070924 A1* 3/2017 Wu ........................ H04W 36/08

FOREIGN PATENT DOCUMENTS

WO WO-2018175593 A1 * 9/2018 ........... H04B 7/0617

OTHER PUBLICATIONS

Huawei "discussion on remaining issue of radio link monitoring". 3GPP TSG RAN WG1 NR Ad Hoc Meeting; R1-1709921, China Jun. 27-30, 2017 (Year: 2017).*

(Continued)

*Primary Examiner* — Rahel Guarino
(74) *Attorney, Agent, or Firm* — Loza & Loza, LLP

(57) ABSTRACT

In an aspect, a scheduled entity obtains a first set of indications associated with a beam failure recovery procedure, starts at least one of a first timer or a second timer based on the obtained first set of indications, and detects a radio link failure when the first timer expires or when the second timer expires. In some aspects, the scheduled entity starts at least one of the first timer or the second timer when N out-of-sync indications are obtained over a network configured time window, the N out-of-sync indications including aperiodic out-of-sync indications from the first set of indications and out-of-sync indications associated with a radio link monitoring procedure. In some aspects, the scheduled entity starts at least the second timer when the first set of indications includes a single aperiodic out-of-sync indication.

33 Claims, 25 Drawing Sheets

(51) Int. Cl.
*H04B 17/17* (2015.01)
*H04B 17/309* (2015.01)
*H04B 7/06* (2006.01)
*H04B 7/0417* (2017.01)
*H04W 24/08* (2009.01)
*H04W 72/04* (2009.01)

(52) U.S. Cl.
CPC .......... *H04W 76/19* (2018.02); *H04B 7/0417* (2013.01); *H04W 24/08* (2013.01); *H04W 72/046* (2013.01)

(58) Field of Classification Search
CPC . H04W 76/19; H04W 36/0055; H04W 24/08; H04W 72/046; Y02D 70/12; Y02D 70/1262; Y02D 70/126
See application file for complete search history.

(56) References Cited

OTHER PUBLICATIONS

AT&T: "Radio Link Monitoring", 3GPP Draft; R1-1710425 NR RLM, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051299637, Retrieved from the Internet: URL:http://www.3gpp.org/ftp/Meetings_3GPP_SYNC/RAN1/Docs/ [retrieved on Jun. 26, 2017], 5 pages.
Huawei et al., "Discussion on Remaining Issues of Radio Link Monitoring", 3GPP Draft; R1-1709921, 3rd Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017 Jun. 26, 2017, XP051299146, Retrieved from the Internet: URL:http://www.3gpp.org/ftp/Meetings_3GPP_SYNC/RAN1/Docs/ [retrieved on Jun. 26, 2017], 4 pages.
International Search Report and Written Opinion—PCT/US2018/044261—ISA/EPO—dated Oct. 5, 2018.
MCC Support: "Draft Report of 3GPP TSG RAN WG1 #AH_NR2 v0.1.0", 3GPP Draft; Draft Minutes_Report RAN1 #AH_NR2_V010, 3rd Generation Partnership Project (3GPP), Mobile Competence Centre; 650, Route Des Lucioles; F-06921 Sophia-Antipolis Cedex; France, vol. RAN WG1, No. Prague, Czech; Aug. 21, 2017-Aug. 25, 2017 Jul. 3, 2017, XP051306254, Retrieved from the Internet: URL:http://www.3gpp.org/ftp/tsg_ran/WG1_RL1/TSGR1_AH/NR_AH_1706/Report/ [retrieved on Jul. 3, 2017], 105 pages.
Mediatek Inc: "RLM/RLF and Beam Failure Recovery", 3GPP Draft; R2-1706437, 3rd Generation Partnership Project (3GPP), Mobile Competence Centre; 650, Route Des Lucioles; F-06921 Sophia-Antipolis Cedex; France, vol. RAN WG2, No. Qingdao, China ;Jun. 27, 2017-Jun. 29, 2017 Jun. 26, 2017, XP051300943, Retrieved from the Internet: URL: http://www.3gpp.org/ftp/Meetings_3GPP_SYNC/RAN2/Docs/ [retrieved on Jun. 26, 2017], 8 pages.
Qualcomm Incorporated: "Radio Link Monitoring Consideration", 3GPP Draft; R1-1802816 Radio Link Monitoring Consideration, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 17, 2018, XP051398228, Retrieved from the Internet: URL:http://www.3gpp.org/ftp/tsg%5Fran/WG1%5FRL1/TSGR1%5F92/Docs/ [retrieved on Feb. 17, 2018], 7 pages.

* cited by examiner

RADIO LINK FAILURE TIMERS AND CONSTANTS BASED ON RADIO LINK MANAGEMENT AND BEAM FAILURE RECOVERY PROCEDURES

CLAIM OF PRIORITY UNDER 35 U.S.C. § 119

The present Application for Patent claims priority to U.S. Provisional Application No. 62/538,603 entitled "RADIO LINK FAILURE TIMERS AND CONSTANTS BASED ON RADIO LINK MANAGEMENT AND BEAM FAILURE RECOVERY PROCEDURES" filed Jul. 28, 2017, which is assigned to the assignee hereof and hereby expressly incorporated by reference herein.

TECHNICAL FIELD

The technology discussed below relates generally to wireless communication systems, and more particularly, to radio link failure timers and constants based on radio link management and beam failure recovery procedures.

INTRODUCTION

A user equipment (UE) in a wireless communication network (e.g., a Long Term Evolution (LTE) network, 5G network) may implement a timer to detect a radio link failure. For example, the UE may detect a problem at the physical layer (e.g., when the UE receives N310 consecutive out-of-sync indications) and may start a T310 timer. The UE may stop the T310 timer if N311 in-sync indications are received. Otherwise, if the T310 timer expires, the UE may declare a radio link failure. When a radio link failure is declared, for example, the UE may either enter an idle mode or initiate a connection reestablishment procedure.

In some scenarios, however, one or more portions of the above described approach may prevent the UE from efficiently detecting a radio link failure, thereby reducing the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect of the present disclosure, an apparatus is disclosed. For example, the apparatus may be a scheduled entity (e.g., a user equipment (UE)) as described herein. The apparatus may be configured to obtain a first set of indications associated with a beam failure recovery procedure, start at least one of a first timer or a second timer based on the obtained first set of indications, and detect a radio link failure when the first timer expires or when the second timer expires.

In an aspect of the disclosure, at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure. For example, in this aspect, the N out-of-sync indications may be non-consecutive.

In an aspect of the disclosure, a time period of the second timer is less than a time period of the first timer, wherein the first set of indications includes a single aperiodic out-of-sync indication, and wherein at least the second timer is started when the single aperiodic out-of-sync indication is obtained. In an aspect of the disclosure, the second timer expires prior to the first timer. In some aspects of the disclosure, the time period of the second timer is approximately 0 milliseconds.

In an aspect of the disclosure, at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure. For example, in this aspect, the N out-of-sync indications may be non-consecutive.

In an aspect of the disclosure, at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure. In one aspect of the disclosure, each of the out-of-sync indications associated with a radio link monitoring procedure may carry a same weight as each of the aperiodic out-of-sync indications from the first set of indications. In another aspect, each of the out-of-sync indications associated with a radio link monitoring procedure may carry a different weight in relation to each of the aperiodic out-of-sync indications from the first set of indications.

In an aspect of the disclosure, the apparatus may be further configured to obtain a second set of indications associated with the beam failure recovery procedure while the first timer is running, and detect that the first timer has expired in response to the obtained second set of indications.

In an aspect of the disclosure, the apparatus may be further configured to obtain a second set of indications associated with the beam failure recovery procedure while the first timer is running, and reduce a time period of the first timer in response to the obtained second set of indications.

In an aspect of the disclosure, the apparatus may be further configured to obtain a second set of indications associated with the beam failure recovery procedure while the first timer is running, and stop the first timer in response to the obtained second set of indications.

In an aspect of the disclosure, the apparatus may be further configured to obtain a second set of indications associated with the beam failure recovery procedure while the second timer is running, and stop the second timer in response to the obtained second set of indications.

In an aspect of the disclosure, the apparatus may be further configured to obtain a second set of indications associated with a radio link monitoring procedure while the first and second timers are running, and stop the first and second timers in response to the obtained second set of indications.

In an aspect of the disclosure, the starting at least one of the first timer or the second timer comprises starting the first timer in response to starting the second timer.

In an aspect of the disclosure, a time period of the second timer is less than a time period of the first timer. In an aspect of the disclosure, the first set of indications associated with the beam failure recovery procedure includes one or more aperiodic out-of-sync indications. In an aspect of the disclosure, the first set of indications associated with the beam failure recovery procedure are obtained from a physical protocol layer.

In an aspect of the present disclosure, an apparatus is disclosed. For example, the apparatus may be a scheduled entity (e.g., a user equipment (UE)) as described herein. The apparatus may include at least one processor, a transceiver communicatively coupled to the at least one processor, and a memory communicatively coupled to the at least one processor. The at least one processor may be configured to obtain a first set of indications associated with a beam failure recovery procedure, start at least one of a first timer or a second timer based on the obtained first set of indications, and detect a radio link failure when the first timer expires or when the second timer expires.

In an aspect of the present disclosure, an apparatus is disclosed. For example, the apparatus may be a scheduled entity (e.g., a user equipment (UE)) as described herein. The apparatus may include means for obtaining a first set of indications associated with a beam failure recovery procedure, means for starting at least one of a first timer or a second timer based on the obtained first set of indications, and means for detecting a radio link failure when the first timer expires or when the second timer expires.

In an aspect of the present disclosure, a non-transitory computer-readable medium storing computer-executable code is disclosed. The non-transitory computer-readable medium may include code for causing a computer to obtain a first set of indications associated with a beam failure recovery procedure, start at least one of a first timer or a second timer based on the obtained first set of indications, and detect a radio link failure when the first timer expires or when the second timer expires.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
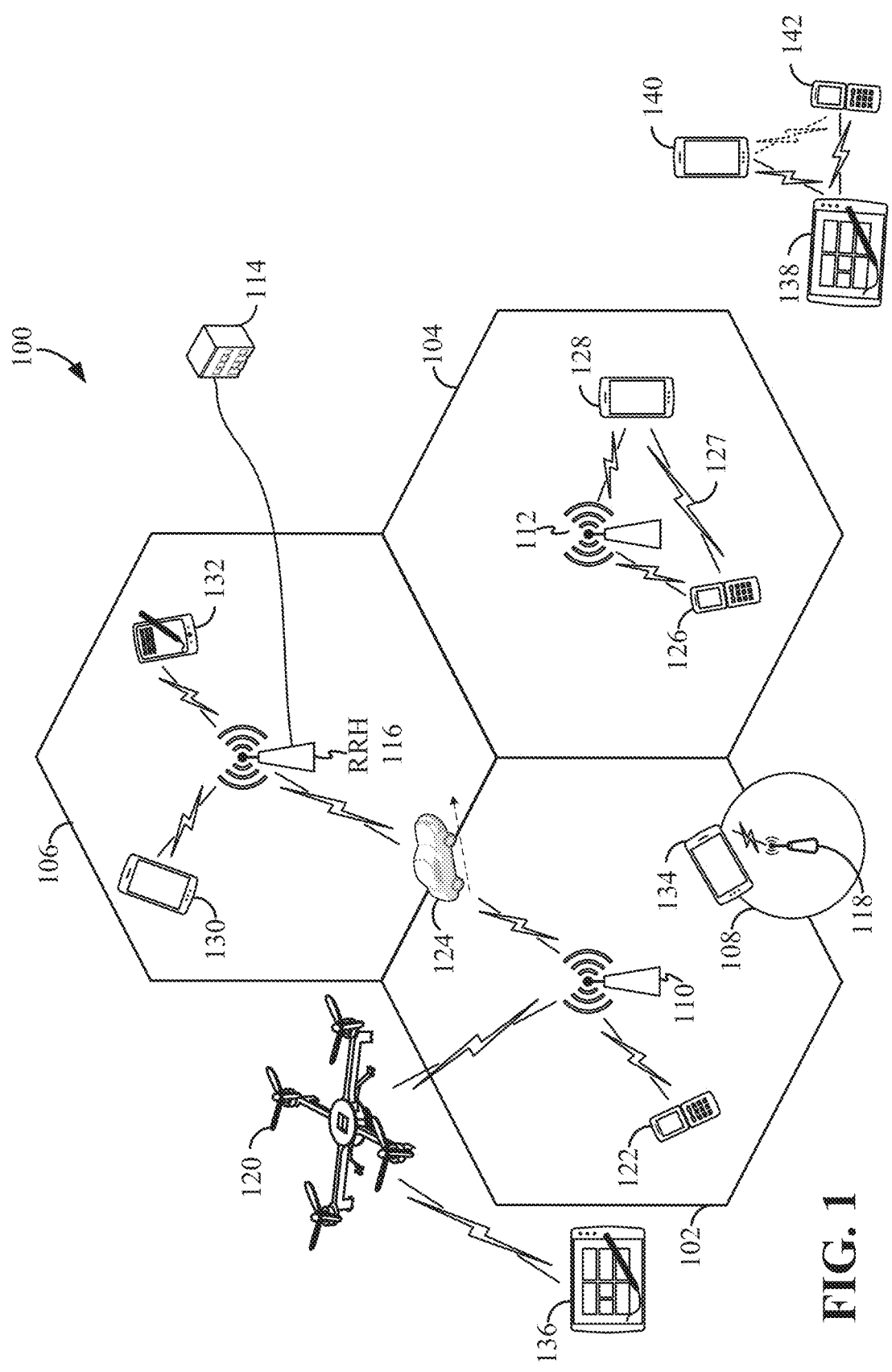
FIG. 1 is a conceptual diagram illustrating an example of a radio access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Definitions

Beamforming: directional signal transmission or reception. For a beamformed transmission, the amplitude and phase of each antenna in an array of antennas may be precoded, or controlled to create a desired (i.e., directional) pattern of constructive and destructive interference in the wavefront.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.
1. In single-user MIMO, the transmitter sends one or more streams to the same receiver, taking advantage of capacity gains associated with using multiple Tx, Rx antennas in rich scattering environments where channel variations can be tracked.
2. The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where base station, in communication with a large number of UEs, can exploit multipath signal propagation to increase overall network capacity by increasing throughput and spectral efficiency, and reducing the required transmission energy.
1. The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells. Transmissions from a base station (e.g., base station 110) to one or more UEs (e.g., UEs 122 and 124) may be referred to as downlink (DL) transmission, while transmissions from a UE (e.g., UE 122) to a base station may be referred to as uplink (UL) transmissions. In accordance with certain aspects of the present disclosure, the term downlink may refer to a point-to-multipoint transmission originating at a scheduling entity 202. Another way to describe this scheme may be to use the term broadcast channel multiplexing. In accordance with further aspects of the present disclosure, the term uplink may refer to a point-to-point transmission originating at a scheduled entity 204.

In some examples, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

In the radio access network 100, the ability for a UE to communicate while moving, independent of its location, is referred to as mobility. The various physical channels between the UE and the radio access network are generally set up, maintained, and released under the control of an access and mobility management function (AMF), which may include a security context management function (SCMF) that manages the security context for both the control plane and the user plane functionality, and a security anchor function (SEAF) that performs authentication. In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
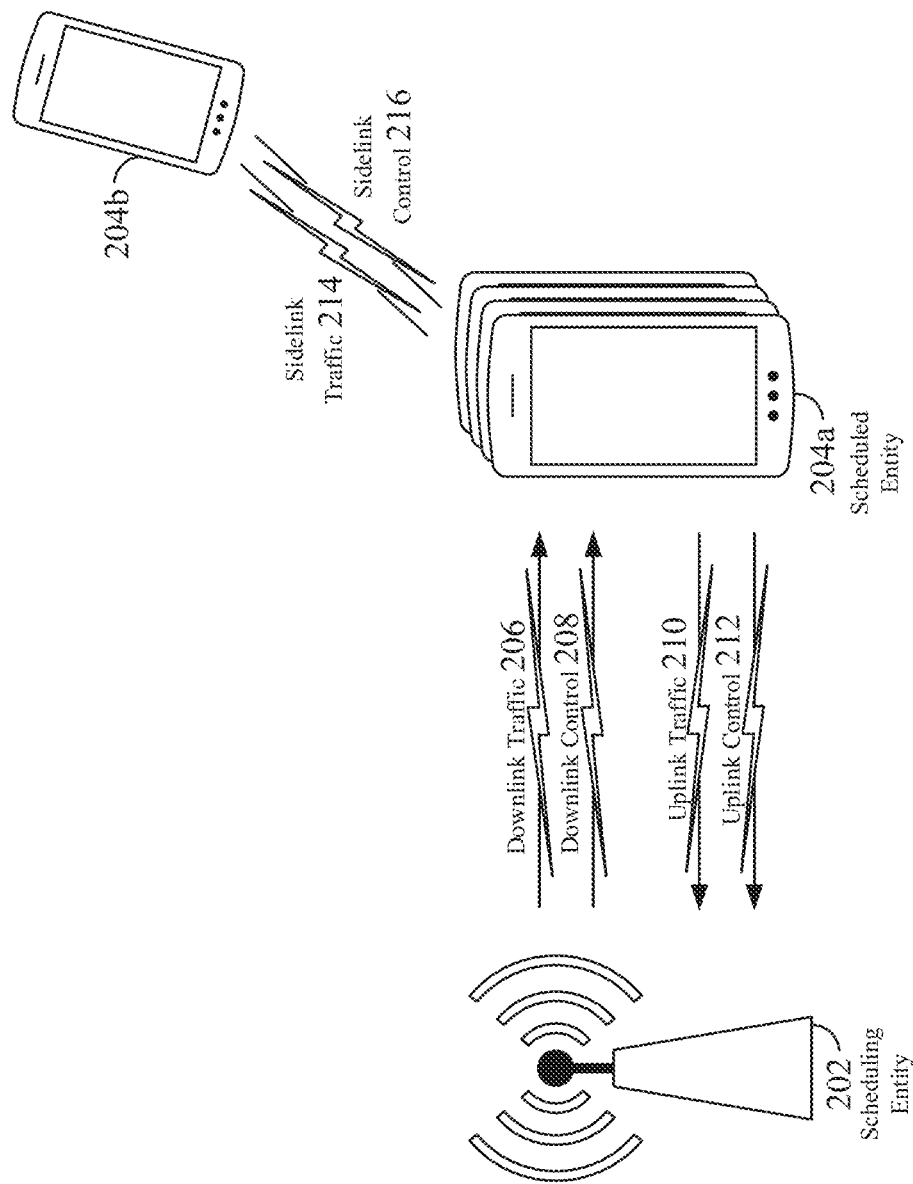
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). Broadly, the scheduling entity 202 is a node or device responsible for scheduling traffic in a wireless communication network, including the downlink transmissions and, in some examples, uplink traffic 210 from one or more scheduled entities to the scheduling entity 202. Broadly, the scheduled entity 204 is a node or device that receives control information, including but not limited to scheduling information (e.g., a grant), synchronization or timing information, or other control information from another entity in the wireless communication network such as the scheduling entity 202.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may in some examples include a request signal, such as a request-to-send (RTS), a source transmit signal (STS), and/or a direction selection signal (DSS). The request signal may provide for a scheduled entity 204 to request a duration of time to keep a sidelink channel available for a sidelink signal. Sidelink control information 216 may further include a response signal, such as a clear-to-send (CTS) and/or a destination receive signal (DRS). The response signal may provide for the scheduled entity 204 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 214.

The air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
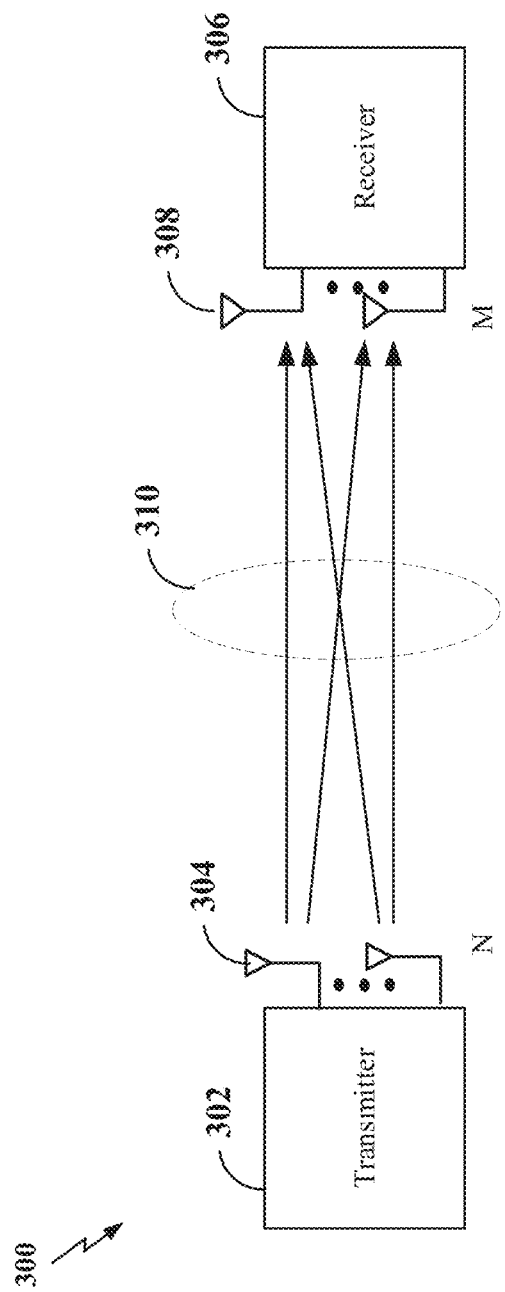
FIG. 3 illustrates an example of a wireless communication system supporting multiple-input multiple-output (MIMO).

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 202, a scheduled entity 204, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Transmissions over the radio access network 100 may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, Turbo codes, low-density parity check (LDPC) codes, and Polar codes. Various implementations of scheduling entities 202 and scheduled entities 204 may include suitable hardware and capabilities (e.g., an encoder, a decoder, and/or a CODEC) to utilize one or more of these error correcting codes for wireless communication.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), discrete Fourier transform (DFT)-spread OFDMA or single-carrier FDMA (DFT-s-OFDMA or SC-FDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 4:
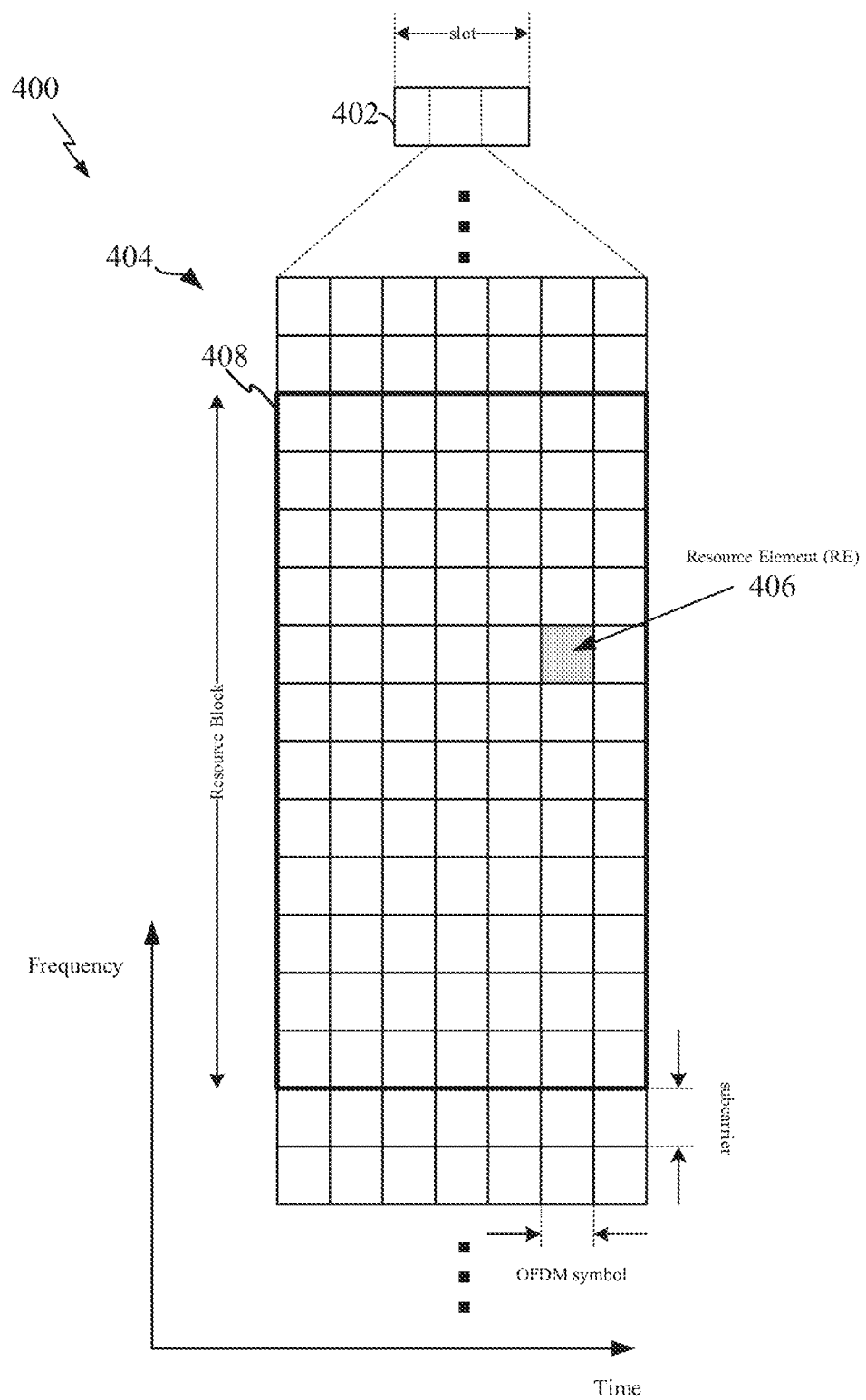
FIG. 4 is a diagram illustrating resources of an orthogonal frequency-division multiplexing (OFDM) waveform according to some aspects of the disclosure.

Various aspects of the present disclosure will be described with reference to an OFDM waveform, as illustrated in FIG. 4. That is, in a 5G NR radio access network, it is anticipated that OFDM may be utilized for DL transmissions, UL transmissions (OFDMA), and/or sidelink transmissions. Accordingly, it should be understood that various aspects of the present disclosure may be applied to any of these links when utilizing OFDM. Furthermore, in a 5G NR radio access network, a waveform other than OFDM may be utilized for UL and/or sidelink transmissions, such as SC-FDMA. It should be further understood that various aspects of the present disclosure may be applied to an SC-FDMA waveform in substantially the same way as described herein below. That is, while some examples of the present disclosure may focus on a DL OFDM link for clarity, it should be understood that the same principles may be applied to DL, UL, and sidelink, utilizing OFDM as well as SC-FDMA waveforms.

Referring now to FIG. 4, an exemplary DL slot 402 in an OFDM air interface is illustrated. However, as those skilled in the art will readily appreciate, the slot structure for any particular application may vary from the example described here, depending on any number of factors. In this example, a portion of a time slot (slot) 402 is expanded to illustrate a resource grid 404, expanded in time and frequency dimensions. Here, time is in the horizontal direction with units of OFDM symbols; and frequency is in the vertical direction with units of subcarriers.

That is, a resource grid 404 may be used to schematically represent time-frequency resources. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. An RB may be the smallest unit of resources that can be allocated to a UE. Thus, the more RBs scheduled for a UE, and the higher the modulation scheme chosen for the air interface, the higher the data rate for the UE. In this illustration, the RB 408 is shown as occupying less than the entire bandwidth of the slot 402, with some subcarriers illustrated above and below the RB 408. In a given implementation, the slot 402 may have a bandwidth corresponding to any number of one or more RBs 408. Further, in this illustration, the RB 408 is shown as occupying less than the entire duration of the slot 402, although this is merely one possible example.

A slot might contain all DL, all UL, or at least one DL portion and at least one UL portion. Within the present disclosure, it is assumed that a single RB such as the RB 408 entirely corresponds to a single direction of communication (either transmission or reception for a given device).

Although not illustrated in FIG. 4, the various REs 406 within the RB 408 may be scheduled to carry one or more physical channels, including control channels, shared channels, data channels, etc. Other REs 406 within the RB 408 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 408.

In a DL transmission, the transmitting device 302 (e.g., the scheduling entity 202) may allocate one or more REs 406 within the RB 408 to carry DL control information 208 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device 302 (e.g., the scheduled entity 204) may utilize one or more REs 406 within the RB 408 to carry UL control information 212 including one or more UL control channels, such as a physical uplink control channel (PUCCH), to the scheduling entity 202. UL control information may include a variety of packet types and categories, including pilots, reference signals, and information configured to enable or assist in decoding uplink data transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule resources for uplink packet transmissions. UL control information may also include HARQ feedback, channel state feedback (CSF), or any other suitable UL control information.

In addition to control information, the RB 408 may include one or more REs 406 allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 406 within a data region may be configured to carry system information blocks (SIBs), carrying information that may enable access to a given cell.

The channels or carriers described above and illustrated in FIG. 2 are not necessarily all the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 5:
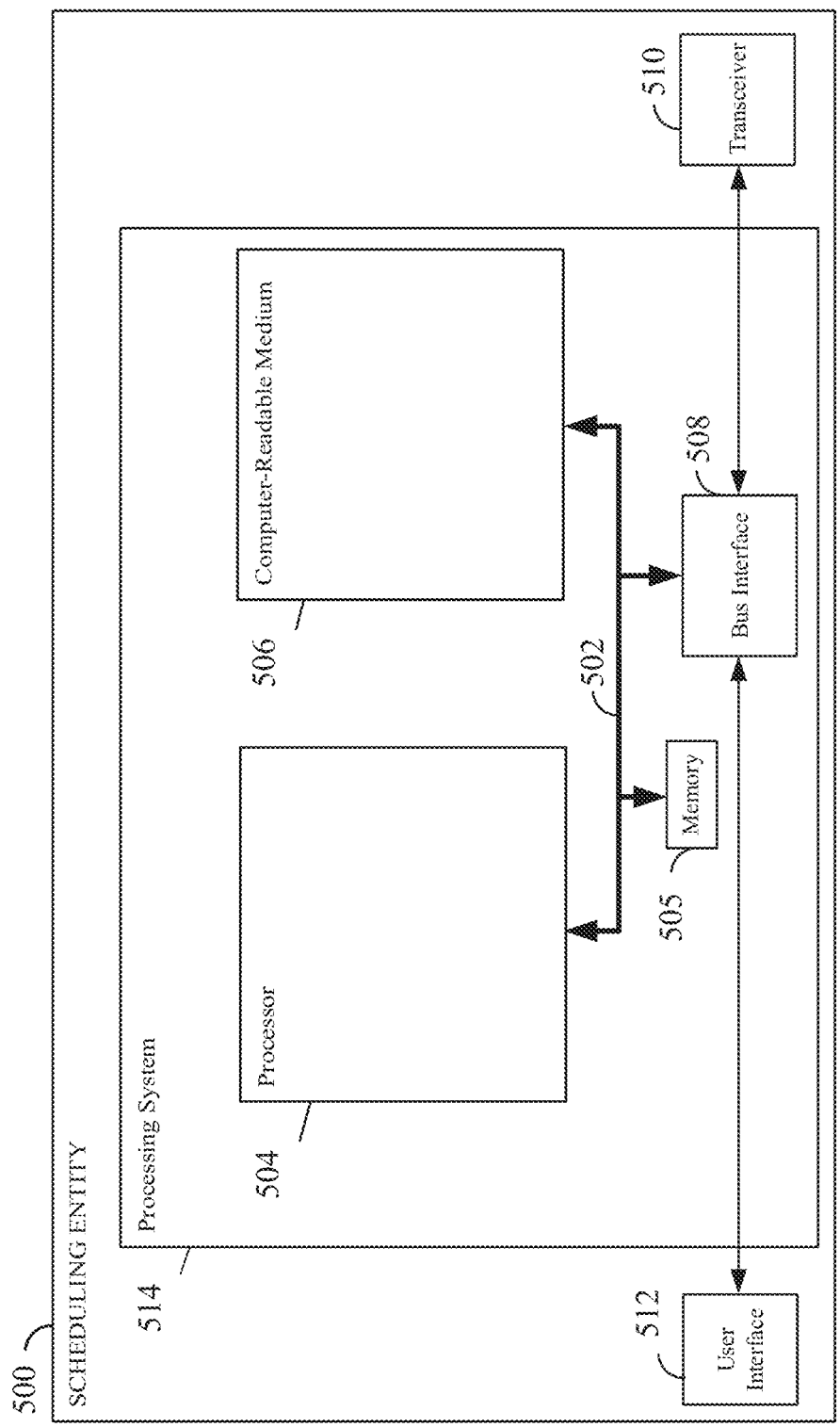
FIG. 5 is a block diagram illustrating an example of a hardware implementation for a scheduling entity employing a processing system.

FIG. 5 is a block diagram illustrating an example of a hardware implementation for a scheduling entity 500 employing a processing system 514. For example, the scheduling entity 500 may be a base station as illustrated in any one or more of FIGS. 1 and/or 2.

The scheduling entity 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 500 may be configured to perform any one or more of the functions described herein.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a communication interface or means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 6:
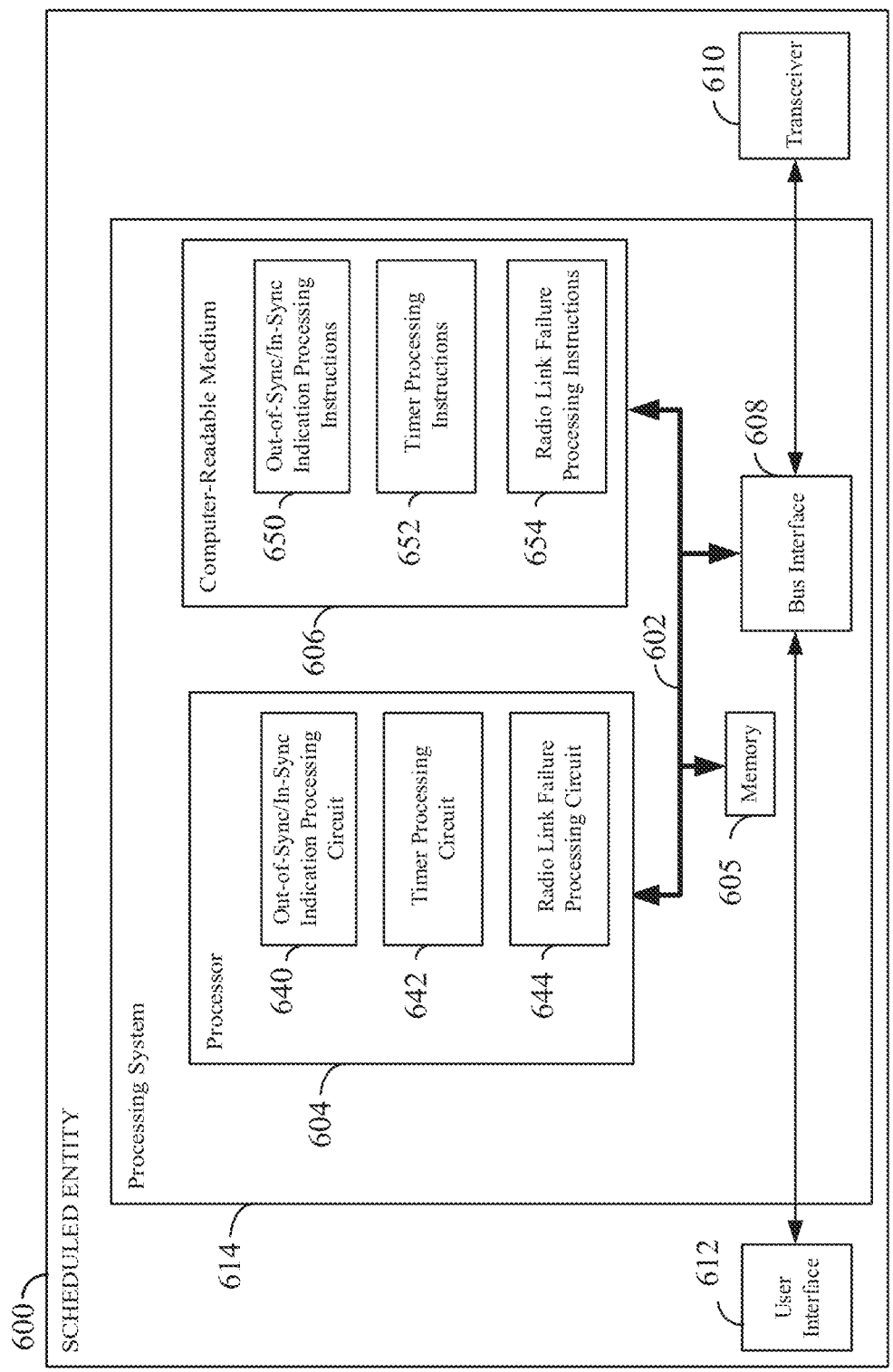
FIG. 6 is a block diagram illustrating an example of a hardware implementation for a scheduled entity employing a processing system.

FIG. 6 is a conceptual diagram illustrating an example of a hardware implementation for an exemplary scheduled entity 600 employing a processing system 614. In accordance with various aspects of the disclosure, an element, or any portion of an element, or any combination of elements may be implemented with a processing system 614 that includes one or more processors 604. For example, the scheduled entity 600 may be a user equipment (UE) as illustrated in any one or more of FIGS. 1 and/or 2.

The processing system 614 may be substantially the same as the processing system 514 illustrated in FIG. 5, including a bus interface 608, a bus 602, memory 605, a processor 604, and a computer-readable medium 606. Furthermore, the scheduled entity 600 may include a user interface 612 and a transceiver 610 substantially similar to those described above in FIG. 5. That is, the processor 604, as utilized in a scheduled entity 600, may be used to implement any one or more of the processes described below and illustrated in FIGS. 20-25.

In some aspects of the disclosure, the processor 604 may include out-of-sync/in-sync indication processing circuitry 640 configured for various functions, including, for example, obtaining (e.g., from a lower protocol layer, such as a physical layer L1) a first set of indications associated with a beam failure recovery procedure and/or obtaining a second set of indications. In an aspect, the first set of indications associated with the beam failure recovery procedure may include one or more aperiodic out-of-sync indications. In an aspect of the disclosure, the second set of indications may include one or more aperiodic out-of-sync indications associated with the beam failure recovery procedure, one or more aperiodic in-sync indications associated with the beam failure recovery procedure, or one or more periodic in-sync indications associated with a radio link monitoring procedure. For example, the out-of-sync/in-sync indication processing circuitry 640 may be configured to implement one or more of the functions described below in relation to FIGS. 20-25, including, e.g., blocks 2002, 2102, 2202, 2302, 2402, and 2502.

In some aspects of the disclosure, the processor 604 may include timer processing circuitry 642 configured for various functions, including, for example, starting at least one of a first timer (e.g., T310 timer) or a second timer (e.g., new timer T disclosed herein) based on the obtained first set of indications, stopping the first timer in response to obtaining the second set of indications, stopping the second timer in response to obtaining the second set of indications, and/or stopping the first and second timers in response to obtaining the second set of indications. For example, the timer processing circuitry 642 may be configured to implement one or more of the functions described below in relation to FIGS. 20-25, including, e.g., blocks 2004, 2104, 2204, 2304, 2404, and 2504.

In some aspects of the disclosure, the processor 604 may include radio link failure processing circuitry 644 configured for various functions, including, for example, detecting a radio link failure when the first timer expires or when the second timer expires. For example, the radio link failure processing circuitry 644 may be configured to implement one or more of the functions described below in relation to FIGS. 20-25, including, e.g., blocks 2006, 2110, 2210, 2310, 2410, and 2510.

In one or more examples, the computer-readable storage medium 606 may include out-of-sync/in-sync indication processing software 650 configured for various functions, including, for example, obtaining (e.g., from a lower protocol layer, such as a physical layer L1) a first set of indications associated with a beam failure recovery procedure and/or obtaining a second set of indications. For example, the out-of-sync/in-sync indication processing software 650 may be configured to implement one or more of the functions described above in relation to FIGS. 20-25, including, e.g., blocks 2002, 2102, 2202, 2302, 2402, and 2502.

In one or more examples, the computer-readable storage medium 606 may include timer processing software 652 configured for various functions, including, for example, starting at least one of a first timer (e.g., T310 timer) or a second timer (e.g., new timer T) based on the obtained first set of indications, stopping the first timer in response to obtaining the second set of indications, stopping the second timer in response to obtaining the second set of indications, and/or stopping the first and second timers in response to obtaining the second set of indications. For example, the timer processing software 652 may be configured to implement one or more of the functions described above in relation to FIGS. 20-25, including, e.g., blocks 2004, 2104, 2204, 2304, 2404, and 2504.

In one or more examples, the computer-readable storage medium 606 may include radio link failure processing software 654 configured for various functions, including, for example, detecting a radio link failure when the first timer expires or when the second timer expires. For example, the radio link failure processing software 654 may be configured to implement one or more of the functions described above in relation to FIGS. 20-25, including, e.g., blocks 2006, 2110, 2210, 2310, 2410, and 2510.

The scheduled entity 600 may perform a beam failure recovery procedure to identify and/or recover from radio link issues. For example, the beam failure recovery procedure may include identifying radio link issues at the physical layer (e.g., Layer 1) and providing aperiodic in-sync and aperiodic out-of-sync indications to higher protocol layers (e.g., Layer 2, Layer 3). For example, the beam failure recovery procedure may identify issues with an active control beam (e.g., a physical downlink control channel (PDCCH) or a physical uplink control channel (PUCCH)) based on measurements of one or more downlink (DL) reference signals (RSs). In an aspect, the active control beam may be a unicast transmission to the scheduled entity 600 from the scheduling entity 500. The beam failure recovery procedure may also maintain a set of candidate beams. One or more of these candidate beams may be used to send the beam failure recovery request to the scheduling entity 500. The scheduled entity 600 may further perform a radio link monitoring (RLM) procedure. For example, the radio link monitoring procedure may include identifying radio link issues at the physical layer (e.g., Layer 1) and providing periodic in-sync and periodic out-of-sync indications to higher protocol layers (e.g., Layer 2, Layer 3). The relation between the radio link monitoring procedure and a radio link failure procedure (e.g., LTE) for a primary cell (PCell) and a primary secondary cell (PSCell) is described in Table 1 below.

The constants N310, N311, N313, and N314 referenced in Table 1 above are defined in Table 2 below.

TABLE 2

| Constant | Usage |
|---|---|
| N310 | Maximum number of consecutive "out-of-sync" indications for the PCell received from lower layers |
| N311 | Maximum number of consecutive "in-sync" indications for the PCell received from lower layers |
| N313 | Maximum number of consecutive "out-of-sync" indications for the PSCell received from lower layers |
| N314 | Maximum number of consecutive "in-sync" indications for the PSCell received from lower layers |

Figure 7:
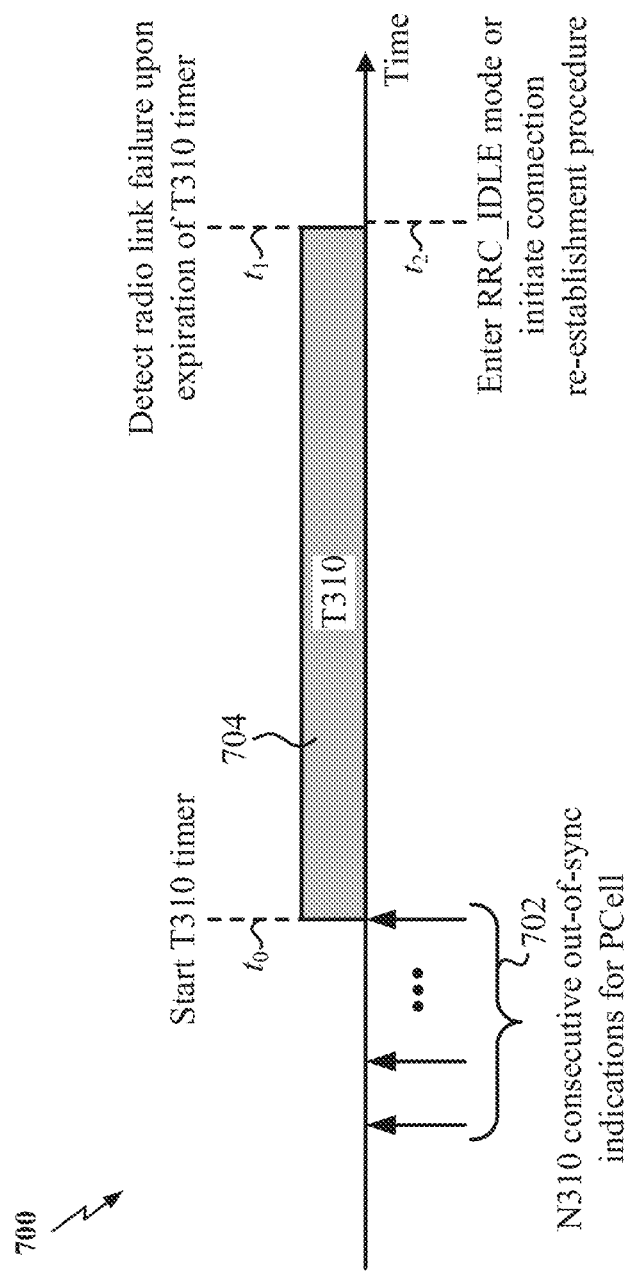
FIG. 7 is a diagram illustrating an approach for a scheduled entity for detecting physical layer problems.

FIG. 7 is a diagram illustrating an approach for a scheduled entity for detecting physical layer problems. In an aspect of the disclosure, a scheduled entity (e.g., the scheduled entity 600) may be in communication with a scheduling entity (e.g., the scheduling entity 500) in a PCell. In some aspects of the disclosure, the scheduling entity may be an eNodeB, base station, or network access point. As shown in FIG. 7, when the scheduled entity receives N310 consecutive out-of-sync indications 702, the scheduled entity may start the T310 timer 704. For example, the scheduled entity may start the T310 timer 704 at time $t_0$. When the T310 timer 704 expires (e.g., at time $t_1$ in FIG. 7), the scheduled entity may detect a radio link failure. In one example, if security is not activated, the scheduled entity may enter an idle mode (e.g., at time $t_2$), such as a radio resource control idle mode (RRC_IDLE mode), after detection of the radio link failure. In another example, if security is activated, the scheduled entity may initiate a connection re-establishment procedure (e.g., at time $t_2$) after detection of the radio link failure.

Figure 8:
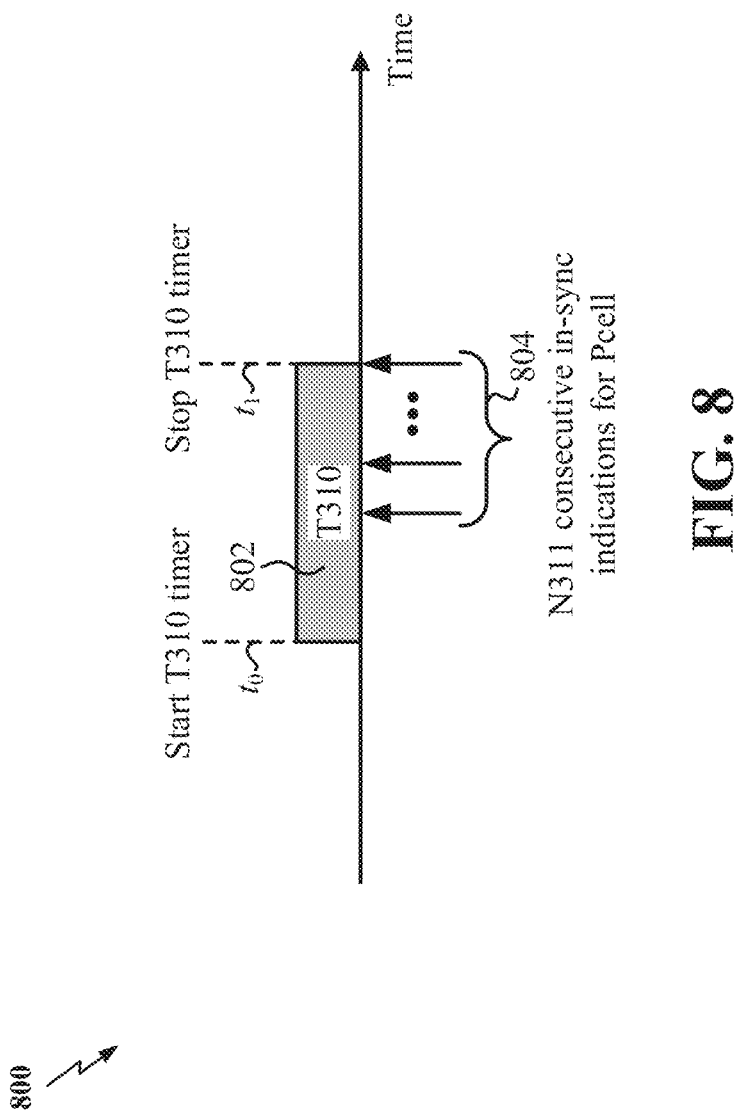
FIG. 8 is a diagram illustrating an approach for a scheduled entity for recovering from physical layer problems.

FIG. 8 is a diagram illustrating an approach for a scheduled entity for recovering from physical layer problems. In an aspect of the disclosure, a scheduled entity (e.g., the scheduled entity 600) may be in communication with a scheduling entity (e.g., the scheduling entity 500) in a PCell. As shown in FIG. 8, the scheduled entity may start the T310 timer 802 at time $t_0$. When the scheduled entity receives N311 consecutive in-sync indications 804 while the T310 timer 802 is running, the scheduled entity may stop the T310 timer 802 before expiration of the T310 timer 802. For example, the scheduled entity may stop the T310 timer 804

TABLE 1

| Timers | Start | Stop | At expiration |
|---|---|---|---|
| T310 | Upon detecting physical layer problems for the PCell (e.g., upon receiving N310 consecutive out-of-sync indications from lower layers) | Upon receiving N311 consecutive in-sync indications from lower layers for the PCell, upon triggering the handover procedure, and upon initiating the connection re-establishment procedure. | If security is not activated: go to RRC_IDLE: initiate the connection re-establishment procedure. |
| T313 | Upon detecting physical layer problems for the PSCell (e.g., upon receiving N313 consecutive out-of-sync indications from lower layers) | Upon receiving N314 consecutive in-sync indications from lower layers for the PSCell, upon initiating the connection reestablishment procedure, upon secondary cell group (SCG) release, and upon receiving RRCConnectionReconfiguration including MobilityControlInfoSCG | Inform E-UTRAN about the SCG radio link failure by initiating the SCG failure information procedure. | when the last of the N311 consecutive in-sync indications 804 is received (e.g., at time $t_1$). Therefore, in the aspect of FIG. 8, the scheduled entity may maintain a radio resource connection without explicit signaling.

In some aspects of the disclosure, a radio link failure procedure may implement periodic in-sync indications and/or periodic out-of-sync indications from the radio link monitoring (RLM) procedure, and aperiodic in-sync indications and/or aperiodic out-of-sync indications from the beam failure recovery procedure. The aspects described herein are directed to radio link failure related actions based on the T310 timer, and to the implementation of a new timer (e.g., new timer T) defined for aperiodic in-sync indications and aperiodic out-of-sync indications associated with a beam failure recovery procedure. For example, the aspects described herein may be implemented for a PCell or PSCell in a wireless communication network.

Aperiodic Out-of-Sync Indications

In one aspect of the disclosure, an aperiodic out-of-sync indication may be associated with a beam failure recovery procedure. For example, a scheduled entity may receive (e.g., from a lower protocol layer, such as the physical layer) an aperiodic out-of-sync indication when a beam failure recovery procedure fails. For example, a beam failure recovery procedure may fail when there is no response from the network during one or more communication attempts. In one example scenario, the scheduled entity may attempt to communicate with the network as part of a beam failure recovery procedure by transmitting a random access preamble to the network. If the scheduled entity does not receive a random access response from the network, the scheduled entity may indicate a random access problem to upper protocol layers. The upper protocol layers at the scheduled entity may interpret the indicated random access problem as an aperiodic out-of-sync indication.

In another aspect, a scheduled entity may receive an aperiodic out-of-sync indication when the scheduled entity does not have any beams in the candidate beam set, in which case the scheduled entity will not be able to send a beam failure recovery request to the network. Therefore, in one example, a scheduled entity may receive an aperiodic out-of-sync indication when the scheduled entity cannot send an uplink (UL) signal due to a power limitation or other issue(s). In another aspect, a scheduled entity may receive an aperiodic out-of-sync indication when the quality of a beam failure detection reference signal (RS) is below a threshold over one or more instances.

Aperiodic In-Sync Indication

In one aspect of the disclosure, an aperiodic in-sync indication may be associated with a success of a beam failure recovery procedure. For example, a scheduled entity may receive an aperiodic in-sync indication when a beam failure recovery procedure succeeds. For example, a beam failure recovery procedure may be considered successful when the scheduled entity receives a response from the network. In one example scenario, the scheduled entity may attempt to communicate with the network as part of a beam failure recovery procedure by transmitting a random access preamble to the network. If the scheduled entity receives a random access response from the network, the beam failure recovery procedure may be considered successful. In another example scenario, if the scheduled entity receives a control channel (e.g., PDCCH) addressed to it, the beam failure recovery procedure may be considered successful. In another aspect of the disclosure, a scheduled entity may receive an aperiodic in-sync indication when the quality of a beam failure detection reference signal (RS) is above a threshold over one or more instances.

Triggers for Starting the T310 Timer

In a wireless communication network, such as in a PCell of a Long Term Evolution (LTE) network, a scheduled entity typically starts a T310 timer when physical layer problems are detected (e.g., when the scheduled entity receives N310 out-of-sync indications). For example, the scheduled entity may receive the N310 out-of-sync indications from lower protocol layers, such as a physical layer. For example, the scheduled entity may detect such physical layer problems when operating in a PCell. The scheduled entity may stop the T310 timer upon receiving N311 consecutive in-sync indications. For example, the scheduled entity may receive the N311 in-sync indications from lower protocol layers. If the T310 timer expires, the scheduled entity may detect a radio link failure. The scheduled entity may then enter an idle mode (e.g., RRC_IDLE mode) if security is not activated, or may initiate a connection reestablishment procedure if security is activated.

Figure 9:
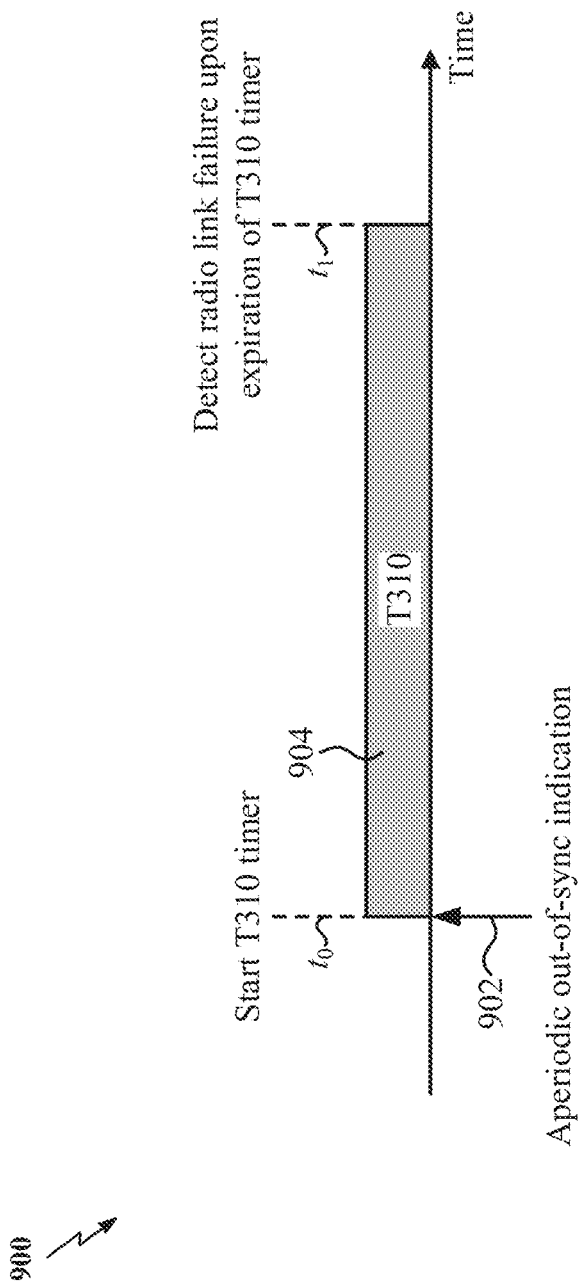
FIG. 9 is a diagram illustrating an approach for a scheduled entity for detecting physical layer problems in accordance with various aspects of the disclosure.

FIG. 9 is a diagram illustrating an approach for a scheduled entity for detecting physical layer problems in accordance with various aspects of the disclosure. As shown in FIG. 9, when the scheduled entity receives one aperiodic out-of-sync indication 902, the scheduled entity may start the T310 timer 904. For example, the scheduled entity may start the T310 timer 904 at time $t_0$. In an aspect of the disclosure, the scheduled entity may receive the aperiodic out-of-sync indication 902 from a lower protocol layer, such as the physical layer. When the T310 timer 904 expires (e.g., at time $t_1$ in FIG. 9), the scheduled entity may detect a radio link failure.

Figure 10:
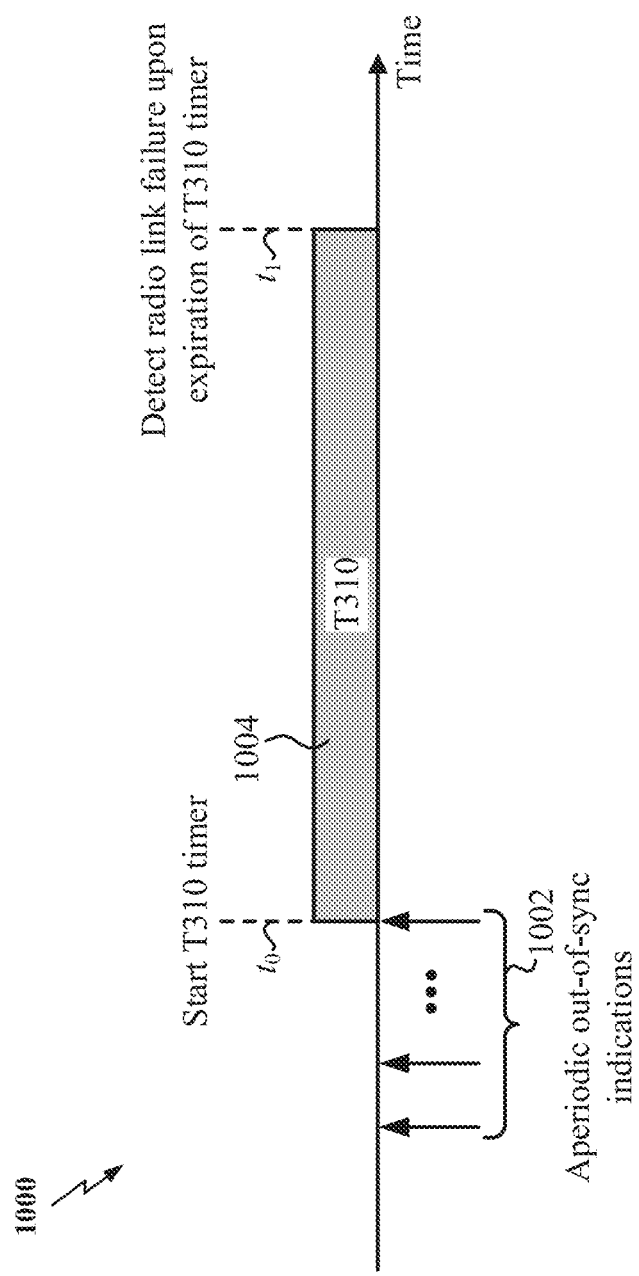
FIG. 10 is a diagram illustrating an approach for a scheduled entity for detecting physical layer problems in accordance with various aspects of the disclosure.

FIG. 10 is a diagram illustrating an approach for a scheduled entity for detecting physical layer problems in accordance with various aspects of the disclosure. As shown in FIG. 10, when the scheduled entity receives one or more consecutive aperiodic out-of-sync indications 1002, the scheduled entity may start the T310 timer 1004. For example, the scheduled entity may start the T310 timer 1004 at time $t_0$. In an aspect of the disclosure, the scheduled entity may receive the one or more consecutive aperiodic out-of-sync indications 1002 from lower protocol layers. When the T310 timer 1004 expires (e.g., at time $t_1$ in FIG. 10), the scheduled entity may detect a radio link failure.

Figure 11:
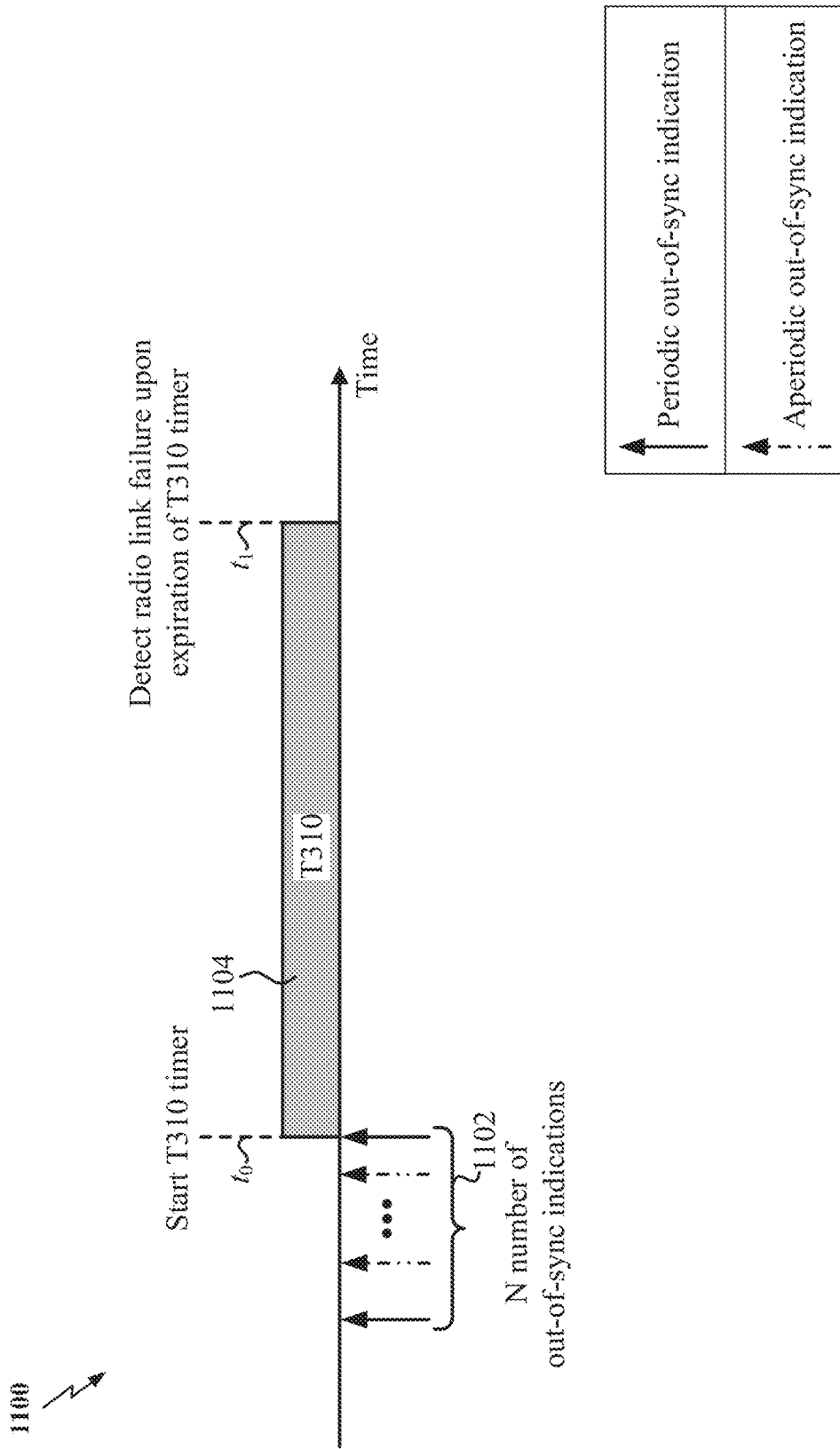
FIG. 11 is a diagram illustrating an approach for a scheduled entity for detecting physical layer problems in accordance with various aspects of the disclosure.

FIG. 11 is a diagram illustrating an approach for a scheduled entity for detecting physical layer problems in accordance with various aspects of the disclosure. As shown in FIG. 11, when the scheduled entity receives an N number of consecutive out-of-sync indications 1102, the scheduled entity may start the T310 timer 1104. For example, the scheduled entity may start the T310 timer 1104 at time $t_0$. In an aspect of the disclosure, the N number of consecutive out-of-sync indications 1102 may include out-of-sync indications associated with the radio link monitoring procedure and aperiodic out-of-sync indications associated with the beam failure recovery procedure. In one aspect of the disclosure, the out-of-sync indications associated with the radio link monitoring procedure and the aperiodic out-of-sync indications associated with the beam failure recovery procedure may carry the same the weight. For example, one aperiodic out-of-sync indication associated with the beam failure recovery procedure may correspond to one out-of-sync indication associated with the radio link monitoring procedure. In another aspect of the disclosure, out-of-sync indications associated with the radio link monitoring procedure and out-of-sync indications associated with the beam failure recovery procedure may carry different weights. For example, one out-of-sync indication associated with the beam failure recovery procedure may correspond to an M number of out-of-sync indications associated with the radio link monitoring procedure. In an aspect, the scheduled entity may receive the N number of consecutive out-of-sync indications 1102 from lower protocol layers. When the T310 timer 1104 expires (e.g., at time $t_1$ in FIG. 11), the scheduled entity may detect a radio link failure.

In one aspect of the disclosure, the scheduled entity may start the T310 timer upon receiving an N number of (e.g., non-consecutive) out-of-sync indications from lower protocol layers over a network configured time window or out of a K number of indications from lower protocol layers. For example, the N number of (e.g., non-consecutive) out-of-sync indications may include out-of-sync indications associated with the radio link monitoring procedure and aperiodic out-of-sync indications associated with the beam failure recovery procedure.

Expiration of the T310 Timer

Figure 12:
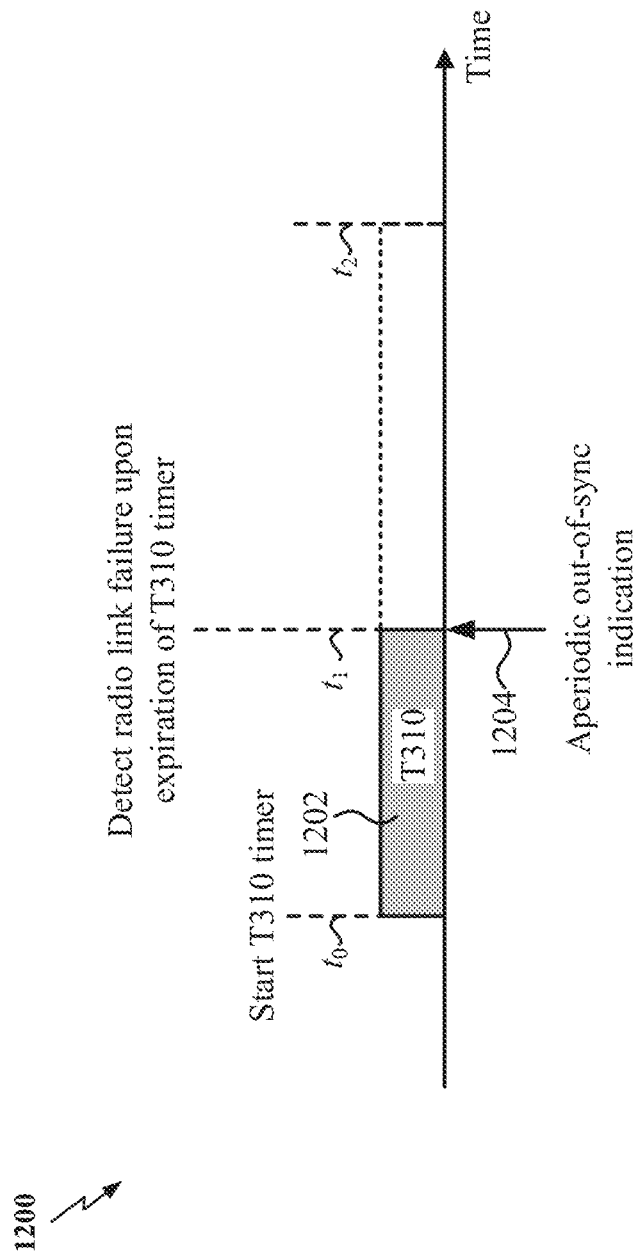
FIG. 12 is a diagram illustrating an approach for a scheduled entity for detecting physical layer problems in accordance with various aspects of the disclosure.

FIG. 12 is a diagram illustrating an approach for a scheduled entity for detecting physical layer problems in accordance with various aspects of the disclosure. The scheduled entity (e.g., the scheduled entity 600) may be in communication with a scheduling entity (e.g., the scheduling entity 500) in a PCell. As shown in FIG. 12, the scheduled entity may start the timer T310 1202 at time $t_0$. When the scheduled entity receives one or more aperiodic out-of-sync indications (e.g., aperiodic out-of-sync indication 1204 received at time $t_1$ in FIG. 12) from lower protocol layers while the T310 timer 1202 is running, the scheduled entity may consider the timer T310 expired and may detect a radio link failure. For example, the scheduled entity may consider the timer T310 expired at time $t_1$. In one example, if security is not activated, the scheduled entity may enter the RRC_IDLE mode after detection of the radio link failure. In another example, if security is activated, the scheduled entity may initiate connection re-establishment procedure after detection of the radio link failure. In the aspect of FIG. 12, it should be noted that the scheduled entity considers the timer T310 1202 expired prior to completion of the configured time period for the T310 timer (e.g., prior to the time $t_2$) due to the one or more aperiodic out-of-sync indications (e.g., aperiodic out-of-sync indication 1204 received at time $t_1$ in FIG. 12) received by the scheduled entity.

Figure 13:
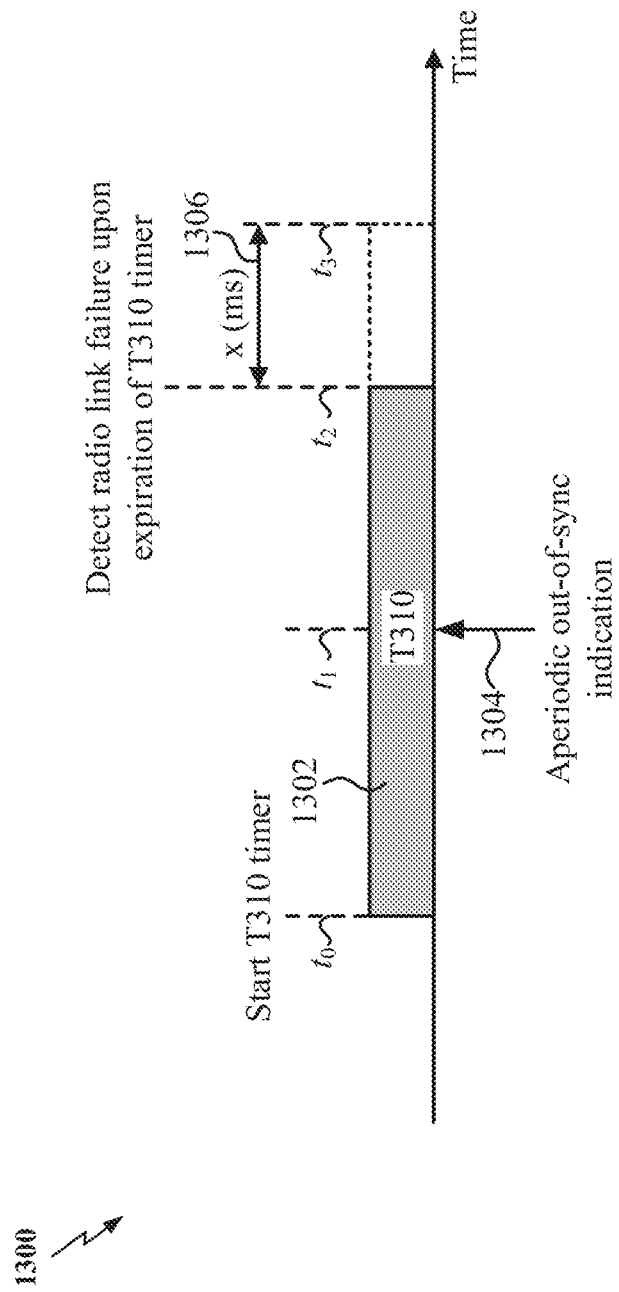
FIG. 13 is a diagram illustrating an approach for a scheduled entity for detecting physical layer problems in accordance with various aspects of the disclosure.

FIG. 13 is a diagram illustrating an approach for a scheduled entity for detecting physical layer problems in accordance with various aspects of the disclosure. The scheduled entity (e.g., the scheduled entity 600) may be in communication with a scheduling entity (e.g., the scheduling entity 500) in a PCell. As shown in FIG. 13, the scheduled entity may start the timer T310 1302 at time $t_0$. When the scheduled entity receives one or more aperiodic out-of-sync indications (e.g., aperiodic out-of-sync indication 1304 received at time $t_1$ in FIG. 13) from lower protocol layers while the T310 timer 1302 is running, the scheduled entity may reduce the configured time period of the T310 timer 1302. In one aspect of the disclosure, as shown in FIG. 13, the scheduled entity may reduce the configured time period of the T310 timer 1302 by a time period x 1306. For example, the time period x 1306 may be a time period (e.g., 50 milliseconds (ms)) configured by the network. In one example, if the configured time period of the T310 timer 1302 is 200 ms (e.g., the time period from time $t_0$ to time $t_3$ in FIG. 13 is 200 ms), the scheduled entity may reduce the configured time period of the T310 timer 1302 by 50 ms (e.g., the time period x 1306 is 50 ms), such that the time period of the T310 timer 1302 is reduced to 150 ms (e.g., the time period from time $t_0$ to time $t_2$ in FIG. 13 is 150 ms). Therefore, in this example, the scheduled entity may consider the timer T310 1302 expired at time t2 and may detect a radio link failure. In one example, if security is not activated, the scheduled entity may enter the RRC_IDLE mode (e.g., after time $t_2$) upon detection of the radio link failure. In another example, if security is activated, the scheduled entity may initiate connection re-establishment procedure (e.g., after time $t_2$) upon detection of the radio link failure. In the aspect of FIG. 13, it should be noted that the scheduled entity considers the timer T310 1302 expired prior to completion of the configured time period for the timer T310 1302 (e.g., prior to the time $t_3$) due to the one or more aperiodic out-of-sync indications (e.g., aperiodic out-of-sync indication 1304 received at time $t_1$ in FIG. 13) received by the scheduled entity.

In another aspect of the disclosure, the scheduled entity may reduce the configured time period of the T310 timer 1302 by a factor 1/n. For example, the value of n may be a number configured by the network. Therefore, in one example, if the value of n is two, the scheduled entity may reduce the configured time period of the T310 timer 1302 by ½ (e.g. one half).

Stopping the T310 Timer

Figure 14:
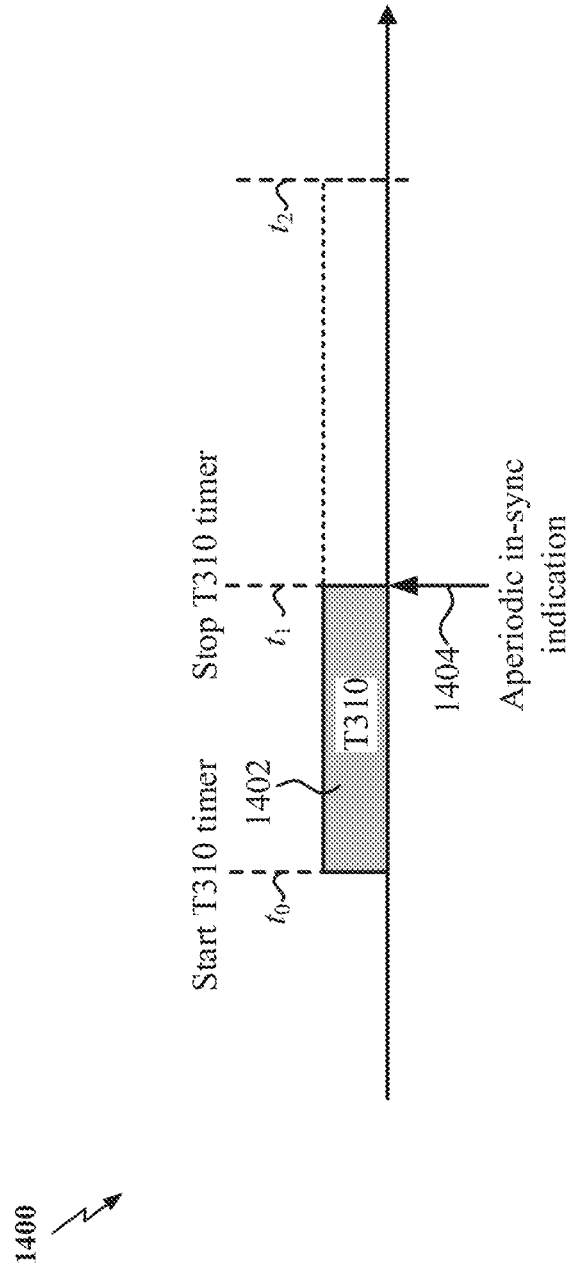
FIG. 14 is a diagram illustrating an approach for a scheduled entity for recovering from physical layer problems in accordance with various aspects of the disclosure.

FIG. 14 is a diagram illustrating an approach for a scheduled entity for recovering from physical layer problems in accordance with various aspects of the disclosure. The scheduled entity (e.g., the scheduled entity 600) may be in communication with a scheduling entity (e.g., the scheduling entity 500) in a PCell. As shown in FIG. 14, the scheduled entity may start the T310 timer 1402 at time $t_0$. When the scheduled entity receives one or more consecutive aperiodic in-sync indications (e.g., aperiodic in-sync indication 1404 received at time $t_1$ in FIG. 14) from lower protocol layers while the T310 timer 1402 is running, the scheduled entity may stop the T310 timer 1402. For example, the scheduled entity may stop the T310 timer 1402 at time $t_1$. In the aspect of FIG. 14, it should be noted that the scheduled entity stops the T310 timer 1402 prior to completion of the configured time period for the T310 timer 1402 (e.g., prior to the time $t_2$) in response to the one or more aperiodic in-sync indications (e.g., aperiodic in-sync indication 1404 received at time $t_1$ in FIG. 14) received by the scheduled entity.

New Timer T

Figure 15:
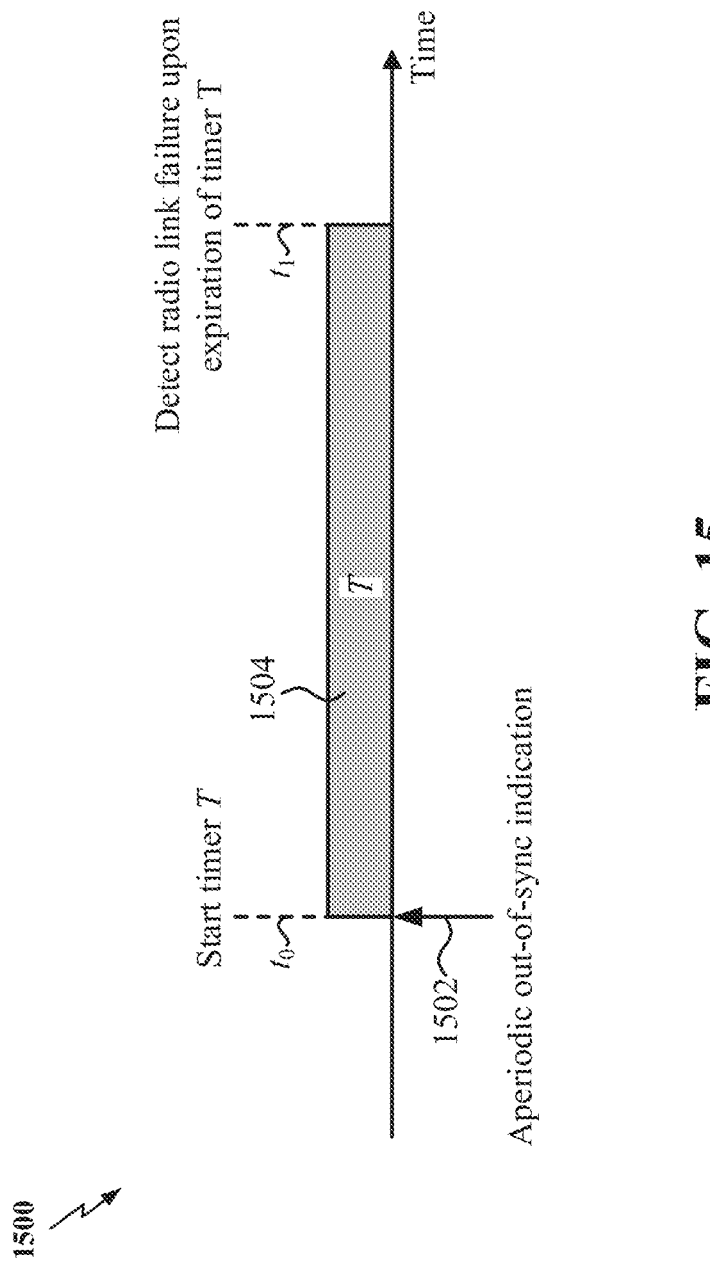
FIG. 15 is a diagram illustrating an approach for a scheduled entity for detecting physical layer problems in accordance with various aspects of the disclosure.

A new timer T may be defined for aperiodic in-sync indications and aperiodic out-of-sync indications associated with a beam failure recovery procedure. FIG. 15 is a diagram illustrating an approach for a scheduled entity for detecting physical layer problems in accordance with various aspects of the disclosure. As shown in FIG. 15, when the scheduled entity (e.g., the scheduled entity 600) receives one aperiodic out-of-sync indication 1502, the scheduled entity may start the timer T 1504. For example, the scheduled entity may start the timer T 1504 at time $t_0$. In an aspect, the scheduled entity may receive the aperiodic out-of-sync indication 1502 from lower protocol layers. When the timer T 1504 expires (e.g., at time $t_1$ in FIG. 15), the scheduled entity may detect a radio link failure. In some aspects of the disclosure, the scheduled entity may start the timer T 1504 independent of the T310 timer. For example, the scheduled entity may start the timer T 1504 while the T310 timer is running or not running. In some aspects of the disclosure, the configured time period for the timer T 1504 may be substantially less than the time period of the T310 timer. In such aspects of the disclosure, for example, the configured time period for the timer T 1504 may be approximately 0 ms (e.g., the difference between time $t_1$ and time $t_0$ in FIG. 15 may be negligible). Therefore, in some aspects of the disclosure, it should be understood that the scheduled entity may start the timer T 1504 when the scheduled entity receives the aperiodic out-of-sync indication 1502 and may detect an immediate expiration of the timer T 1504 in cases where the configured time period of the timer T 1504 is approximately 0 ms.

Figure 16:
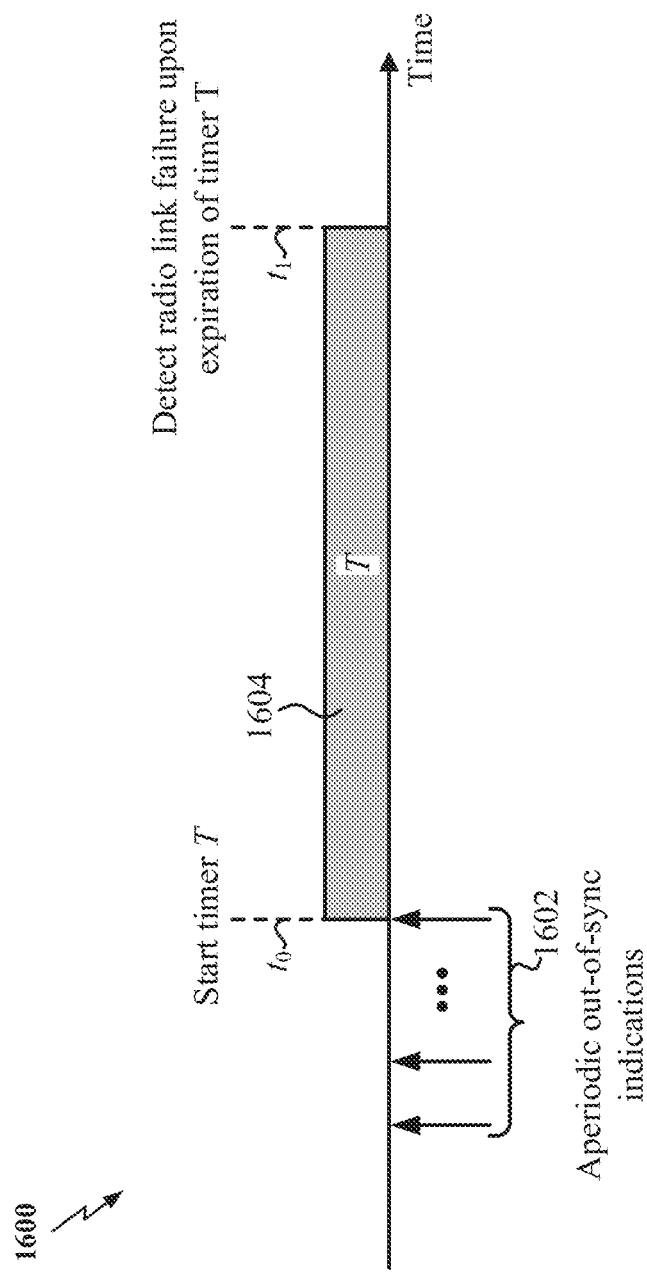
FIG. 16 is a diagram illustrating an approach for a scheduled entity for detecting physical layer problems in accordance with various aspects of the disclosure.

FIG. 16 is a diagram illustrating an approach for a scheduled entity for detecting physical layer problems in accordance with various aspects of the disclosure. As shown in FIG. 16, when the scheduled entity (e.g., the scheduled entity 600) receives one or more consecutive aperiodic out-of-sync indications 1602, the scheduled entity may start the timer T 1604. For example, the scheduled entity may start the timer T 1604 at time $t_0$. In an aspect, the scheduled entity may receive the one or more consecutive aperiodic out-of-sync indications 1602 from lower protocol layers. When the timer T 1604 expires (e.g., at time $t_1$ in FIG. 16), the scheduled entity may detect a radio link failure.

In one aspect of the disclosure, the scheduled entity may start the timer T 1604 upon receiving an N number of (e.g., non-consecutive) out-of-sync indications from lower protocol layers over a network configured time window or out of a K number of indications from lower protocol layers. For example, the N number of (e.g., non-consecutive) out-of-sync indications may include out-of-sync indications associated with the radio link monitoring procedure and aperiodic out-of-sync indications associated with the beam failure recovery procedure.

Expiration of the New Timer T

Figure 17:
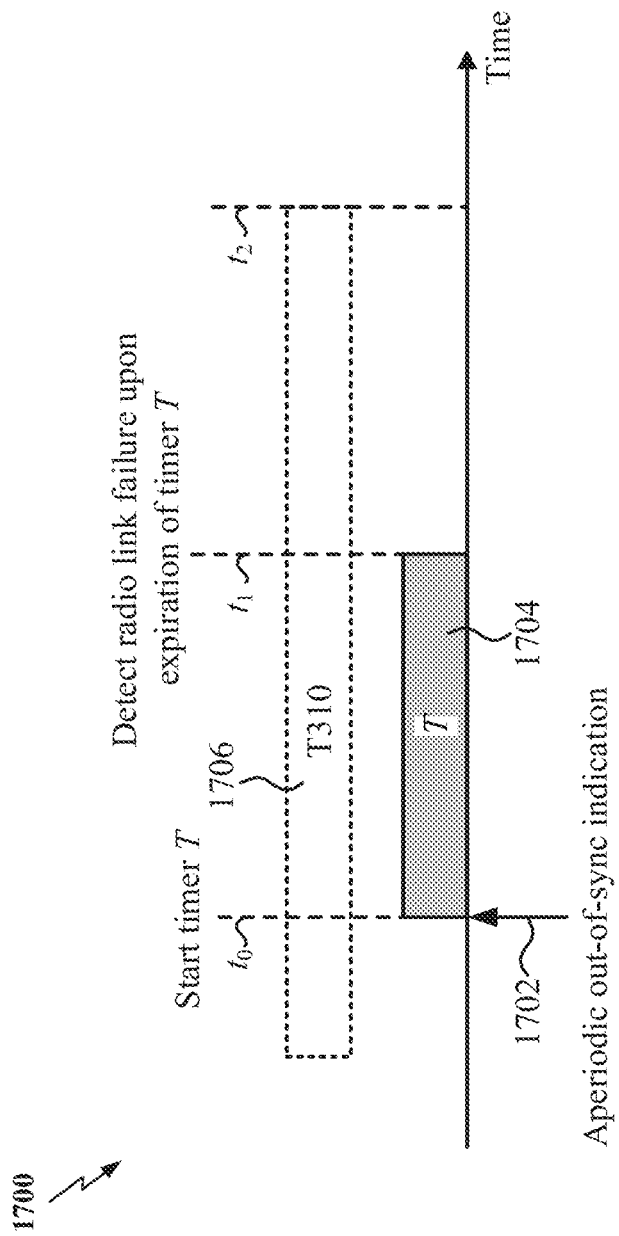
FIG. 17 is a diagram illustrating an approach for a scheduled entity for detecting physical layer problems in accordance with various aspects of the disclosure.

FIG. 17 is a diagram illustrating an approach for a scheduled entity for detecting physical layer problems in accordance with various aspects of the disclosure. The scheduled entity (e.g., the scheduled entity 600) may be in communication with a scheduling entity (e.g., the scheduling entity 500) in a PCell. As shown in FIG. 17, when the scheduled entity receives one aperiodic out-of-sync indication 1702, the scheduled entity may start the timer T 1704. For example, the scheduled entity may start the timer T 1704 at time $t_0$. In an aspect of the disclosure, the scheduled entity may receive the aperiodic out-of-sync indication 1702 from lower protocol layers. When the timer T 1704 expires (e.g., at time $t_1$ in FIG. 17), the scheduled entity may detect a radio link failure. In one example, if security is not activated, the scheduled entity may enter the RRC_IDLE mode after detection of the radio link failure (e.g., after time $t_1$). In another example, if security is activated, the scheduled entity may initiate connection re-establishment procedure after detection of the radio link failure (e.g., after time $t_1$).

In the aspect of FIG. 17, it should be noted that the timer T 1704 may be running in parallel with the T310 timer 1706. As shown in FIG. 17, the scheduled entity may have started the T310 timer 1706 prior to time $t_0$. As further shown in FIG. 17, the scheduled entity detects a radio link failure upon expiration of the timer T 1704 (e.g., at time $t_1$) and before the expiration of the T310 timer 1706. In other cases, the scheduled entity may detect a radio link failure upon expiration of the T310 timer 1706 (e.g., at time $t_2$), which may occur earlier than the expiration of timer T 1704 (e.g., at time $t_1$). In some aspects of the disclosure, the configured time period for the timer T 1704 may be substantially less than the time period of the T310 timer. In such aspects of the disclosure, for example, the configured time period for the timer T 1704 may be approximately 0 ms (e.g., the difference between time $t_1$ and time $t_0$ in FIG. 17 may be negligible).

Stopping the New Timer T

In one aspect of the disclosure, the scheduled entity (e.g., the scheduled entity 600) may stop the timer T described herein upon triggering a handover procedure. In another aspect of the disclosure, the scheduled entity may stop the timer T upon expiration of the T310 timer.

Figure 18:
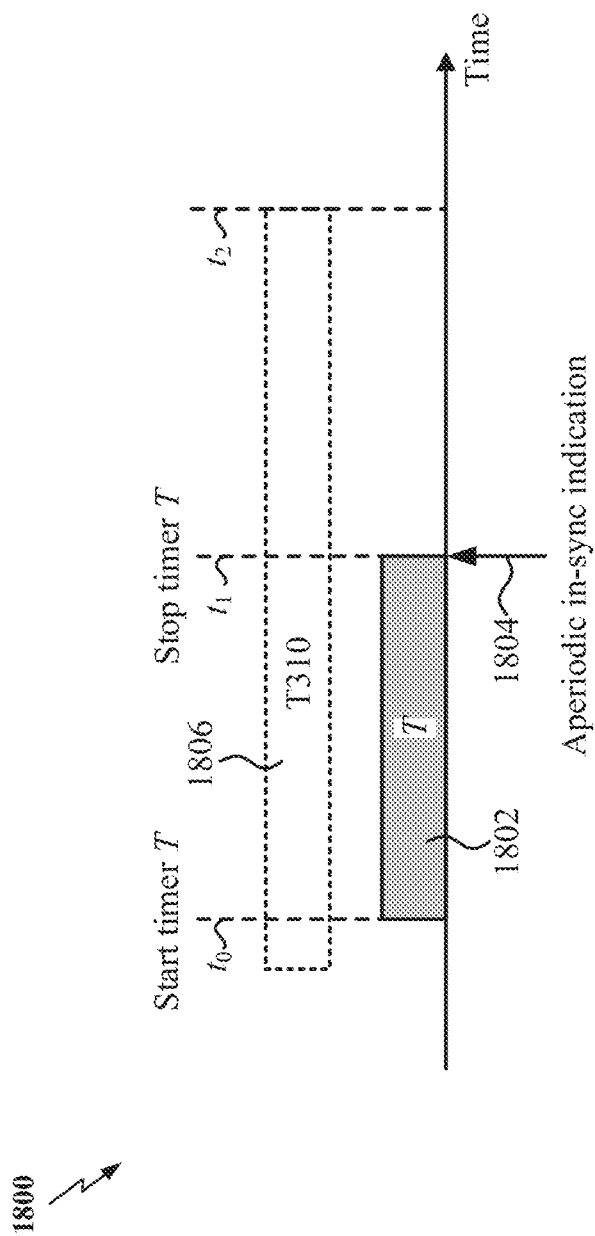
FIG. 18 is a diagram illustrating an approach for a scheduled entity for recovering from physical layer problems in accordance with various aspects of the disclosure.

FIG. 18 is a diagram illustrating an approach for a scheduled entity for recovering from physical layer problems in accordance with various aspects of the disclosure. The scheduled entity (e.g., the scheduled entity 600) may be in communication with a scheduling entity (e.g., the scheduling entity 500) in a PCell. As shown in FIG. 18, the scheduled entity may start the timer T 1802 at time $t_0$. When the scheduled entity receives one or more consecutive aperiodic in-sync indications (e.g., aperiodic in-sync indication 1804 received at time $t_1$ in FIG. 18) from lower protocol layers while the timer T 1802 is running, the scheduled entity may stop the timer T 1802. For example, the scheduled entity may stop the timer T 1802 at time $t_1$. In the aspect of FIG. 18, it should be noted that the scheduled entity stops the timer T 1802 prior to the expiration of the configured time period for the T310 timer 1806 (e.g., prior to the time $t_2$) in response to the one or more aperiodic in-sync indications (e.g., aperiodic in-sync indication 1804 received at time $t_1$ in FIG. 18) received by the scheduled entity.

Figure 19:
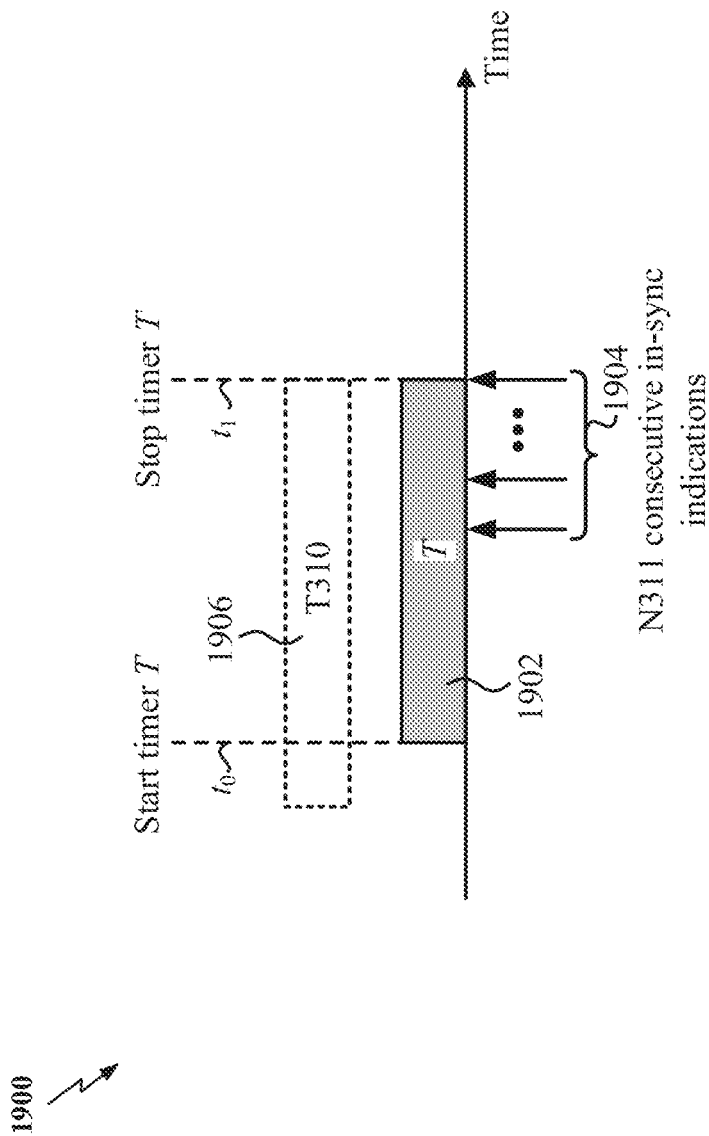
FIG. 19 is a diagram illustrating an approach for a scheduled entity for recovering from physical layer problems in accordance with various aspects of the disclosure.

FIG. 19 is a diagram illustrating an approach for a scheduled entity for recovering from physical layer problems in accordance with various aspects of the disclosure. The scheduled entity (e.g., the scheduled entity 600) may be in communication with a scheduling entity (e.g., the scheduling entity 500) in a PCell. As shown in FIG. 19, the scheduled entity may start the timer T 1902 at time $t_0$. When the scheduled entity receives N311 consecutive in-sync indications 1904 while the timer T 1902 is running, the scheduled entity may stop the timer T 1902. For example, the N311 consecutive in-sync indications 1904 may be associated with the radio link monitoring procedure. For example, the scheduled entity may stop the timer T 1902 when the last of the N311 consecutive in-sync indications 1904 is received (e.g., at time $t_1$).

In the aspect of FIG. 19, it should be noted that the timer T 1902 may be running in parallel with the T310 timer 1906. As shown in FIG. 19, the scheduled entity may have started the T310 timer 1906 prior to time $t_0$. Therefore, in the aspect of FIG. 19, it should be noted that the scheduled entity may also stop the T310 timer 1906 when the last of the N311 consecutive in-sync indications 1904 is received (e.g., at time $t_1$).

Relationship(s) Between the Timer T and T310 Timer

In one aspect of the disclosure, the scheduled entity may start the T310 timer when the scheduled entity receives N310 consecutive out-of-sync indications associated with the radio link monitoring procedure. In another aspect of the disclosure, the scheduled entity may start the T310 timer when the scheduled entity starts the timer T.

In one aspect of the disclosure, the scheduled entity may stop the T310 timer upon receiving N311 consecutive in-sync indications. In another aspect of the disclosure, the scheduled entity may stop the T310 timer when the scheduled entity stops the timer T.

Network Configuration of Priority Between Radio Link Monitoring Procedure and Beam Failure Recovery Procedure In one aspect of the disclosure, the network may specify rules and/or conditions for a radio link failure procedure based on the radio link monitoring procedure and the beam failure recovery procedure. In one example, the network may specify a priority between the radio link monitoring procedure and the beam failure recovery procedure. In another example, the network may configure the scheduled entity to rely on aperiodic indications only, the radio link monitoring procedure only, or combinations thereof.

Therefore, the aspects described herein may enable a scheduled entity to more efficiently (e.g., more quickly) detect a radio link failure as compared to conventional approaches for detecting a radio link failure. As such, in one example, the aspects described herein may extend the battery life of the scheduled entity by enabling the scheduled entity to quickly detect a radio link failure and enter an idle mode. In another example, the aspects described herein may enable the scheduled entity to begin looking for a more suitable scheduling entity (e.g., another base station) sooner when a radio link failure occurs, thereby avoiding data communication delays and improving the user experience.

Figure 20:
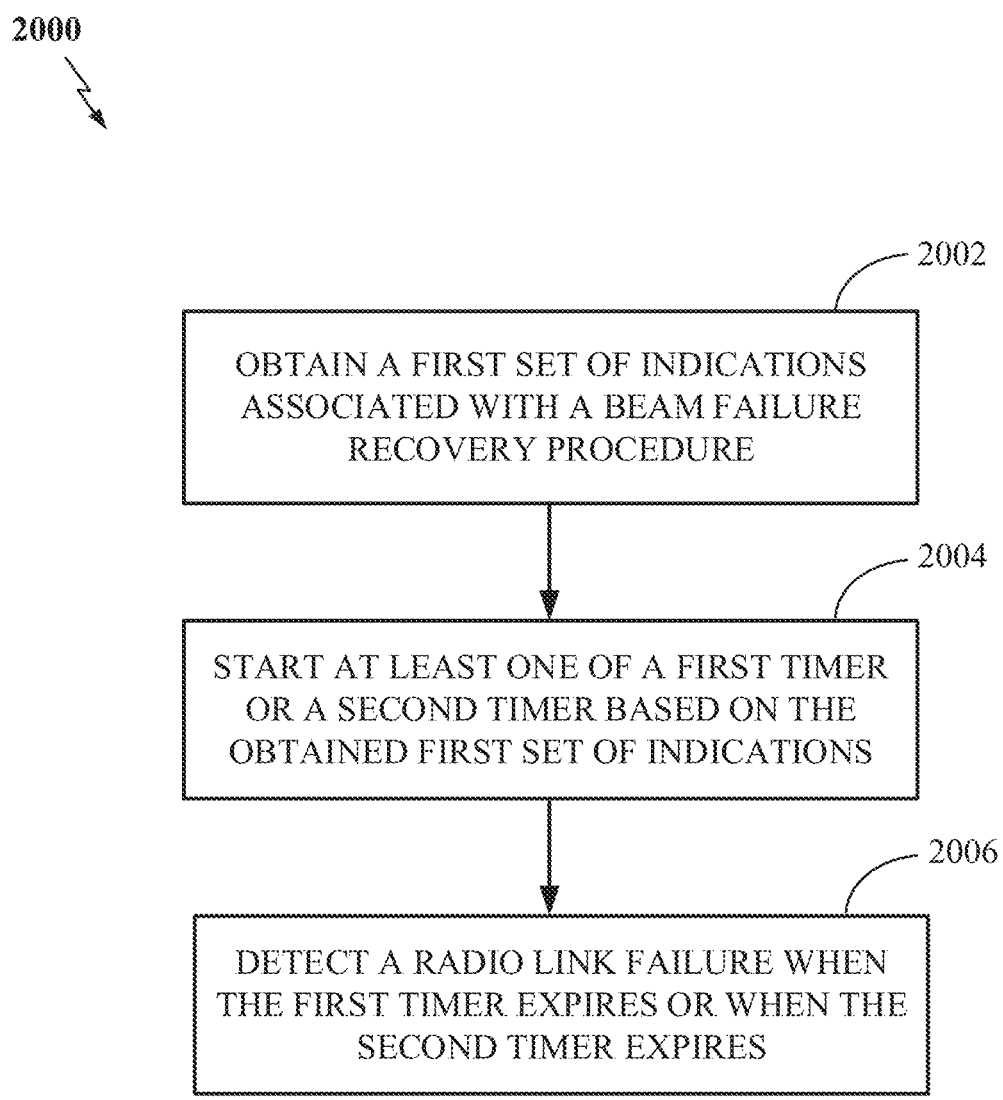
FIG. 20 is a flow chart illustrating an exemplary process for a scheduled entity for detecting physical layer problems in accordance with various aspects of the disclosure.

FIG. 20 is a flow chart illustrating an exemplary process 2000 for detecting physical layer problems at a scheduled entity in accordance with some aspects of the present disclosure. As described below, some or all illustrated features may be omitted in a particular implementation within the scope of the present disclosure, and some illustrated features may not be required for implementation of all embodiments. In some examples, the process 2000 may be carried out by the scheduled entity 600 illustrated in FIG. 6. In some examples, the process 2000 may be carried out by any suitable apparatus or means for carrying out the functions or algorithm described below.

At block 2002, the scheduled entity obtains a first set of indications associated with a beam failure recovery procedure. In an aspect of the disclosure, at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure. In an aspect of the disclosure, at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure. In an aspect of the disclosure, at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure.

At block 2004, the scheduled entity starts at least one of a first timer (e.g., T310) or a second timer (e.g., new timer T) based on the obtained first set of indications. At block 2006, the scheduled entity detects a radio link failure when the first timer expires or when the second timer expires.

Figure 21:
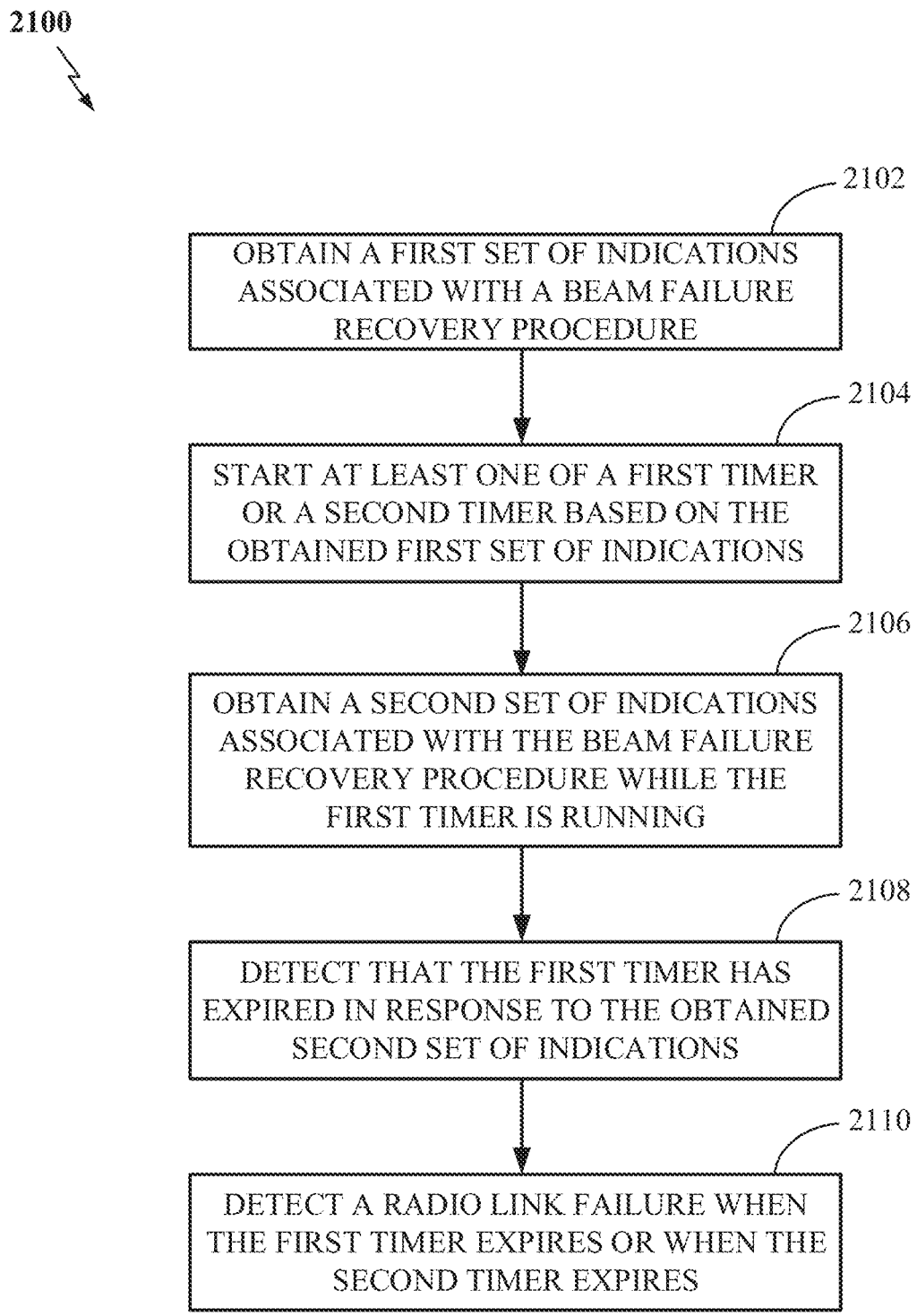
FIG. 21 is a flow chart illustrating an exemplary process for a scheduled entity for detecting physical layer problems in accordance with various aspects of the disclosure.

FIG. 21 is a flow chart illustrating an exemplary process 2100 for detecting physical layer problems at a scheduled entity in accordance with some aspects of the present disclosure. As described below, some or all illustrated features may be omitted in a particular implementation within the scope of the present disclosure, and some illustrated features may not be required for implementation of all embodiments. In some examples, the process 2100 may be carried out by the scheduled entity 600 illustrated in FIG. 6. In some examples, the process 2100 may be carried out by any suitable apparatus or means for carrying out the functions or algorithm described below.

At block 2102, the scheduled entity obtains a first set of indications associated with a beam failure recovery procedure. In an aspect of the disclosure, at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure. In an aspect of the disclosure, at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure. In an aspect of the disclosure, at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure.

At block 2104, the scheduled entity starts at least one of a first timer (e.g., T310) or a second timer (e.g., new timer T) based on the obtained first set of indications. At block 2106, the scheduled entity obtains a second set of indications associated with the beam failure recovery procedure while the first timer is running. At block 2108, the scheduled entity detects that the first timer has expired in response to the obtained second set of indications. At block 2110, the scheduled entity detects a radio link failure when the first timer expires or when the second timer expires.

Figure 22:
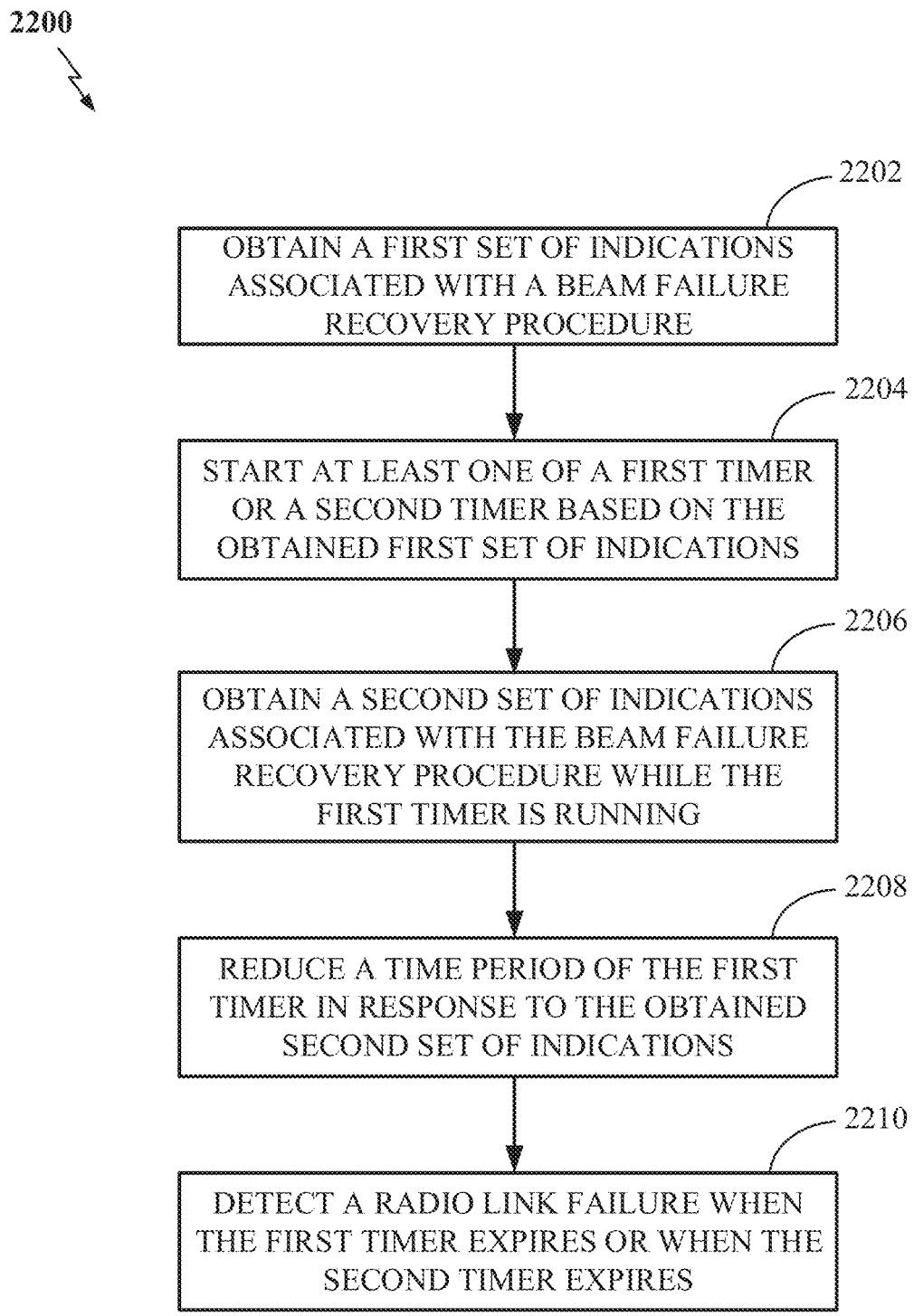
FIG. 22 is a flow chart illustrating an exemplary process for a scheduled entity for detecting physical layer problems in accordance with various aspects of the disclosure.

FIG. 22 is a flow chart illustrating an exemplary process 2200 for detecting physical layer problems at a scheduled entity in accordance with some aspects of the present disclosure. As described below, some or all illustrated features may be omitted in a particular implementation within the scope of the present disclosure, and some illustrated features may not be required for implementation of all embodiments. In some examples, the process 2200 may be carried out by the scheduled entity 600 illustrated in FIG. 6. In some examples, the process 2200 may be carried out by any suitable apparatus or means for carrying out the functions or algorithm described below.

At block 2202, the scheduled entity obtains a first set of indications associated with a beam failure recovery procedure. In an aspect of the disclosure, at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure. In an aspect of the disclosure, at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure. In an aspect of the disclosure, at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure.

At block 2204, the scheduled entity starts at least one of a first timer (e.g., T310) or a second timer (e.g., new timer T) based on the obtained first set of indications. At block 2206, the scheduled entity obtains a second set of indications associated with the beam failure recovery procedure while the first timer is running. At block 2208, the scheduled entity reduces a time period of the first timer in response to the obtained second set of indications. At block 2110, the scheduled entity detects a radio link failure when the first timer expires or when the second timer expires.

Figure 23:
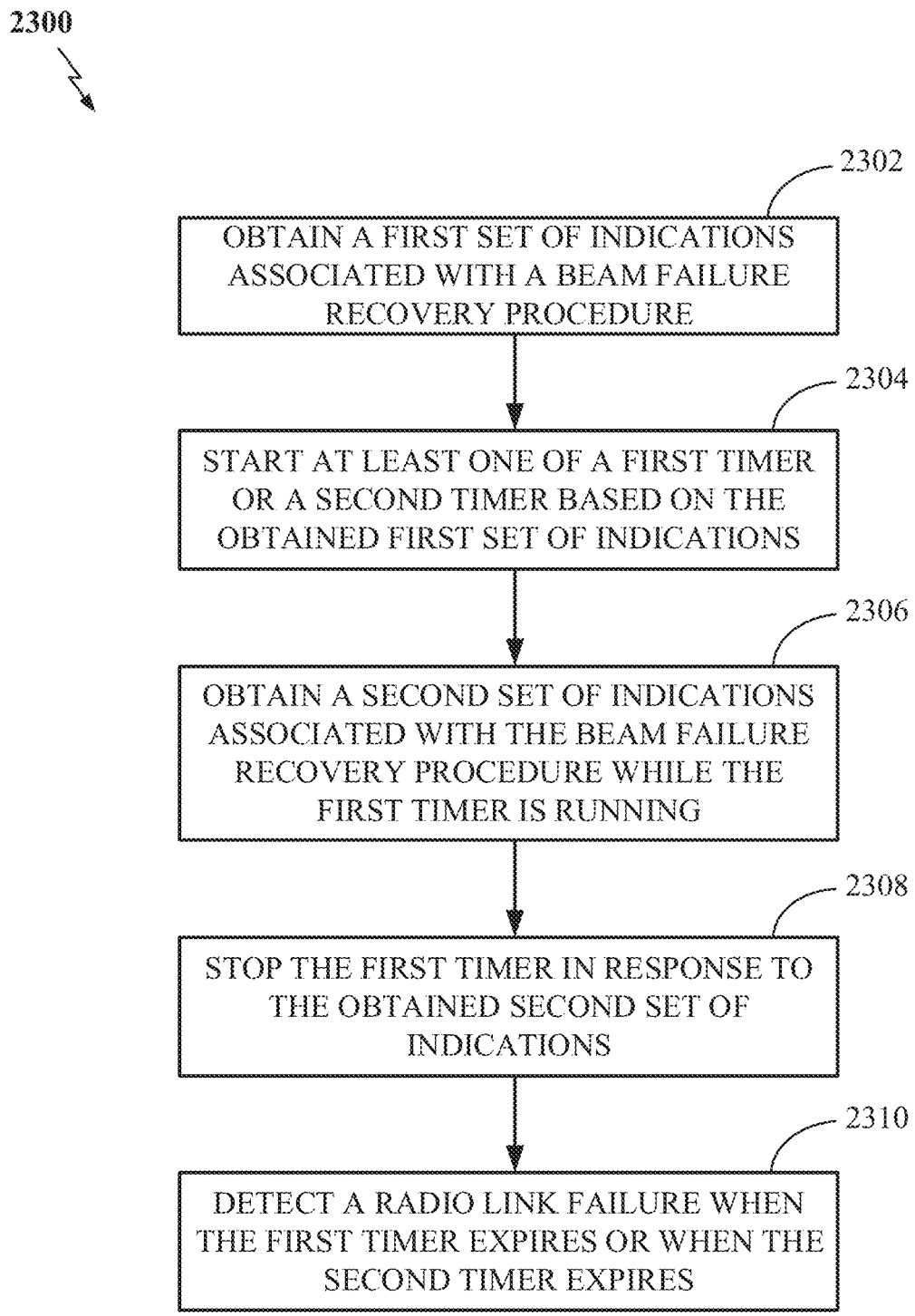
FIG. 23 is a flow chart illustrating an exemplary process for a scheduled entity for detecting physical layer problems in accordance with various aspects of the disclosure.

FIG. 23 is a flow chart illustrating an exemplary process 2300 for detecting physical layer problems at a scheduled entity in accordance with some aspects of the present disclosure. As described below, some or all illustrated features may be omitted in a particular implementation within the scope of the present disclosure, and some illustrated features may not be required for implementation of all embodiments. In some examples, the process 2300 may be carried out by the scheduled entity 600 illustrated in FIG. 6. In some examples, the process 2300 may be carried out by any suitable apparatus or means for carrying out the functions or algorithm described below.

At block 2302, the scheduled entity obtains a first set of indications associated with a beam failure recovery procedure. In an aspect of the disclosure, at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure. In an aspect of the disclosure, at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure. In an aspect of the disclosure, at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure.

At block 2304, the scheduled entity starts at least one of a first timer (e.g., T310) or a second timer (e.g., new timer T) based on the obtained first set of indications. At block 2306, the scheduled entity obtains a second set of indications associated with the beam failure recovery procedure while the first timer is running. At block 2308, the scheduled entity stops the first timer in response to the obtained second set of indications. At block 2310, the scheduled entity detects a radio link failure when the first timer expires or when the second timer expires.

Figure 24:
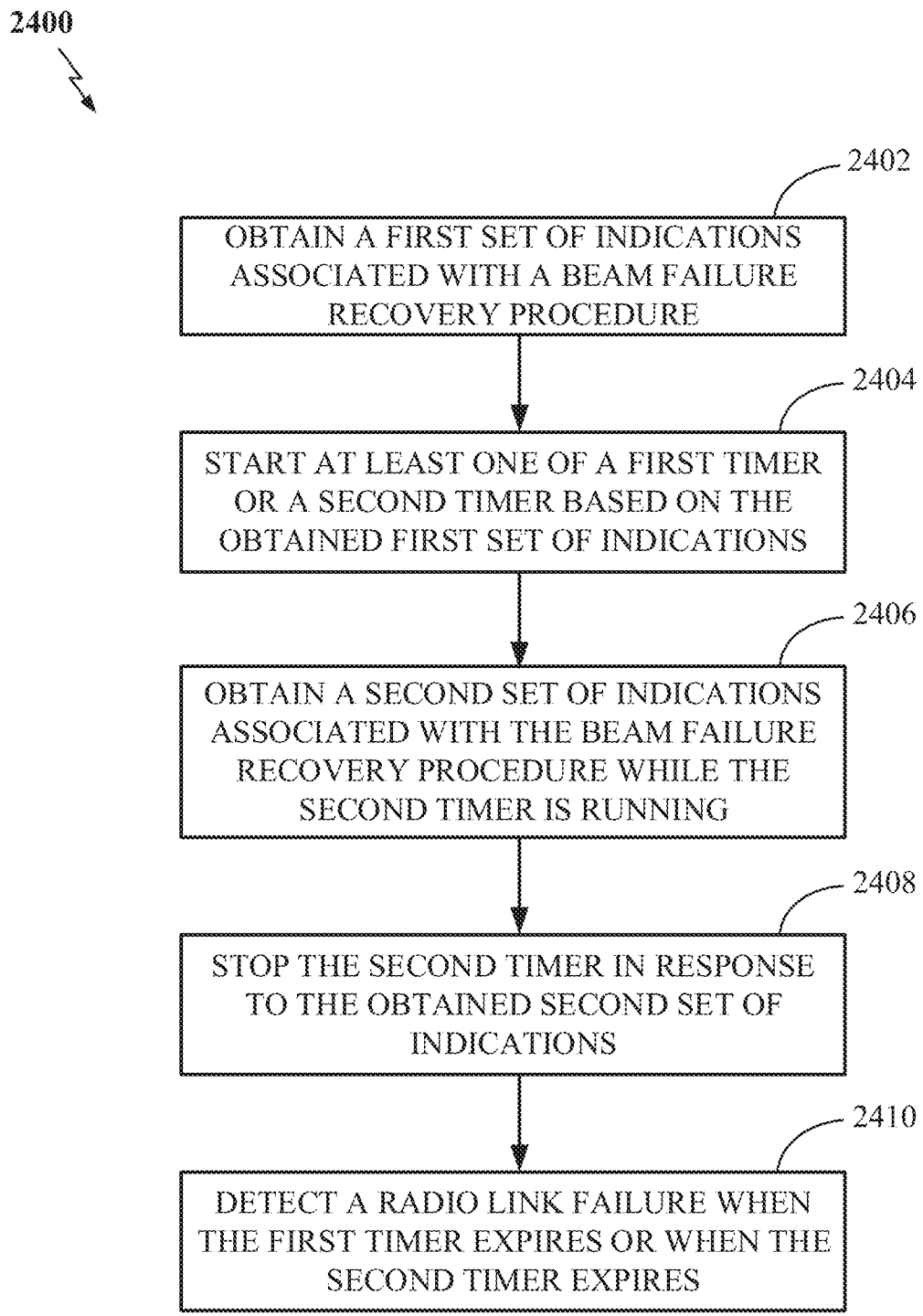
FIG. 24 is a flow chart illustrating an exemplary process for a scheduled entity for detecting physical layer problems in accordance with various aspects of the disclosure.

FIG. 24 is a flow chart illustrating an exemplary process 2400 for detecting physical layer problems at a scheduled entity in accordance with some aspects of the present disclosure. As described below, some or all illustrated features may be omitted in a particular implementation within the scope of the present disclosure, and some illustrated features may not be required for implementation of all embodiments. In some examples, the process 2400 may be carried out by the scheduled entity 600 illustrated in FIG. 6. In some examples, the process 2400 may be carried out by any suitable apparatus or means for carrying out the functions or algorithm described below.

At block 2402, the scheduled entity obtains a first set of indications associated with a beam failure recovery procedure. In an aspect of the disclosure, at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure. In an aspect of the disclosure, at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure. In an aspect of the disclosure, at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure.

At block 2404, the scheduled entity starts at least one of a first timer (e.g., T310) or a second timer (e.g., new timer T) based on the obtained first set of indications. At block 2406, the scheduled entity obtains a second set of indications associated with the beam failure recovery procedure while the second timer is running. At block 2408, the scheduled entity stops the second timer in response to the obtained second set of indications. At block 2410, the scheduled entity detects a radio link failure when the first timer expires or when the second timer expires.

Figure 25:
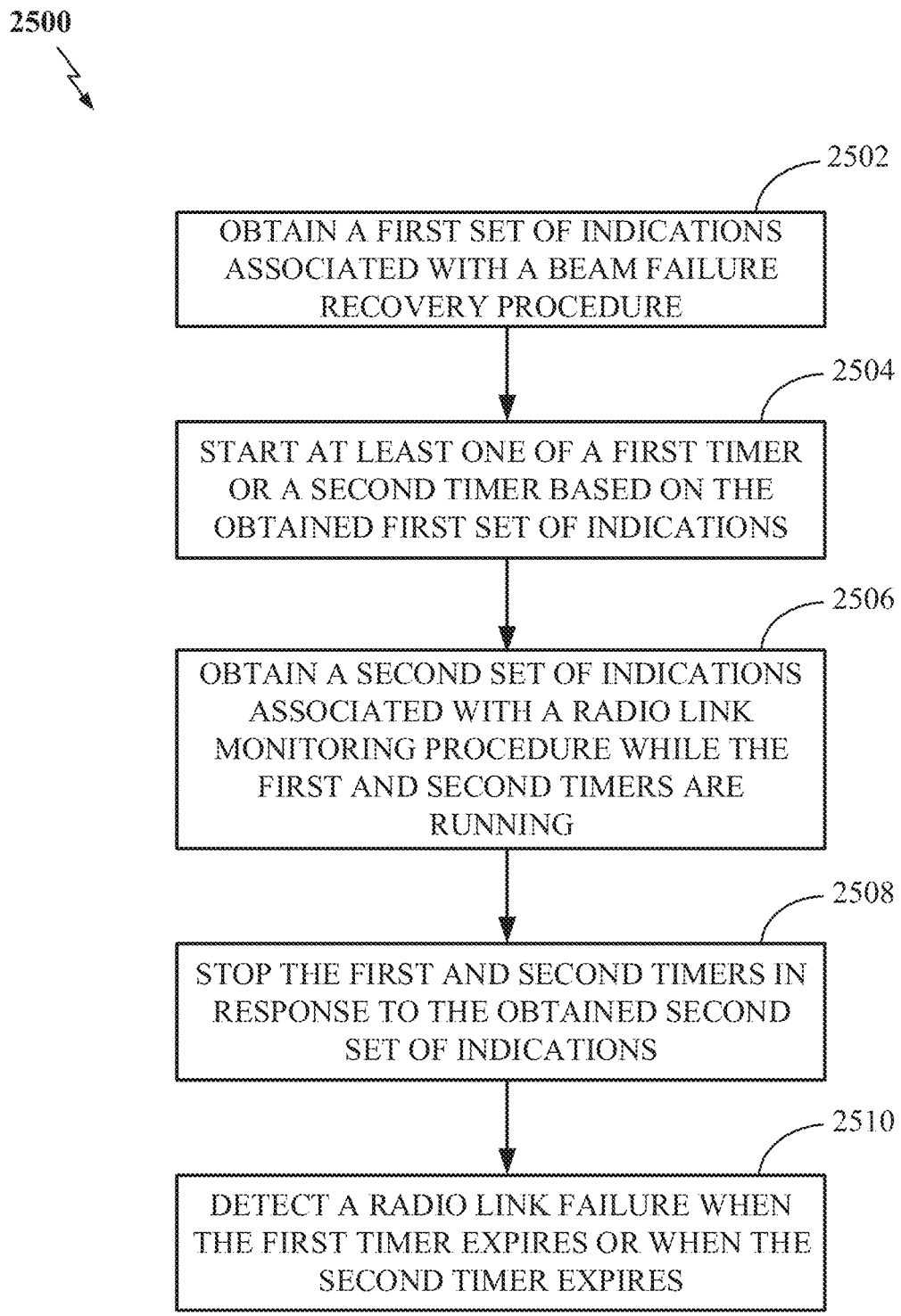
FIG. 25 is a flow chart illustrating an exemplary process for a scheduled entity for detecting physical layer problems in accordance with various aspects of the disclosure.

FIG. 25 is a flow chart illustrating an exemplary process 2500 for detecting physical layer problems at a scheduled entity in accordance with some aspects of the present disclosure. As described below, some or all illustrated features may be omitted in a particular implementation within the scope of the present disclosure, and some illustrated features may not be required for implementation of all embodiments. In some examples, the process 2500 may be carried out by the scheduled entity 600 illustrated in FIG. 6. In some examples, the process 2500 may be carried out by any suitable apparatus or means for carrying out the functions or algorithm described below.

At block 2502, the scheduled entity obtains a first set of indications associated with a beam failure recovery procedure. In an aspect of the disclosure, at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure. In an aspect of the disclosure, at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure. In an aspect of the disclosure, at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure.

At block 2504, the scheduled entity starts at least one of a first timer (e.g., T310) or a second timer (e.g., new timer T) based on the obtained first set of indications. At block 2506, the scheduled entity obtains a second set of indications associated with a radio link monitoring procedure while the first and second timers are running. At block 2508, the scheduled entity stops the first and second timers in response to the obtained second set of indications. At block 2510, the scheduled entity detects a radio link failure when the first timer expires or when the second timer expires.

In one configuration, the apparatus 600 for wireless communication includes means for obtaining a first set of indications associated with a beam failure recovery procedure, means for starting at least one of a first timer or a second timer in response to the obtained first set of indications, and means for detecting a radio link failure when the first timer expires or when the second timer expires. In one aspect, the aforementioned means may be the processor 604 configured to perform the functions recited by the aforementioned means. In another aspect, the aforementioned means may be a circuit or any apparatus configured to perform the functions recited by the aforementioned means.

Of course, in the above examples, the circuitry included in the processor 604 is merely provided as an example, and other means for carrying out the described functions may be included within various aspects of the present disclosure, including but not limited to the instructions stored in the computer-readable storage medium 606, or any other suitable apparatus or means described in any one of the FIG. 1-3, or 6, and utilizing, for example, the processes and/or algorithms described herein in relation to FIGS. 20-25.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "obtaining" may include one or more actions including, but not limited to, receiving, acquiring, determining, or any combination thereof.

One or more of the components, steps, features and/or functions illustrated in FIGS. 1-25 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-25 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduled entity, the method comprising:
   obtaining a first set of indications associated with a beam failure recovery procedure;
   starting at least one of a first timer or a second timer based on the obtained first set of indications, wherein at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure; and
detecting a radio link failure when the first timer expires or when the second timer expires.

2. The method of claim 1, wherein the N out-of-sync indications are non-consecutive.

3. The method of claim 1, further comprising:
obtaining a second set of indications associated with the beam failure recovery procedure while the first timer is running; and
detecting that the first timer has expired in response to the obtained second set of indications.

4. The method of claim 1, further comprising:
obtaining a second set of indications associated with the beam failure recovery procedure while the first timer is running; and
stopping the first timer in response to the obtained second set of indications.

5. The method of claim 1, further comprising:
obtaining a second set of indications associated with the beam failure recovery procedure while the second timer is running; and
stopping the second timer in response to the obtained second set of indications.

6. The method of claim 1, wherein the starting at least one of the first timer or the second timer comprises starting the first timer in response to starting the second timer.

7. The method of claim 1, wherein a time period of the second timer is less than a time period of the first timer.

8. The method of claim 1, wherein the first set of indications associated with the beam failure recovery procedure includes one or more of the aperiodic out-of-sync indications.

9. The method of claim 1, wherein the first set of indications associated with the beam failure recovery procedure are obtained from a physical protocol layer.

10. An apparatus for wireless communication, comprising:
at least one processor;
a transceiver communicatively coupled to the at least one processor; and
a memory communicatively coupled to the at least one processor,
wherein the at least one processor is configured to:
obtain a first set of indications associated with a beam failure recovery procedure;
start at least one of a first timer or a second timer based on the obtained first set of indications, wherein at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure; and
detect a radio link failure when the first timer expires or when the second timer expires.

11. The apparatus of claim 10, wherein the at least on processor is further configured to:
obtain a second set of indications associated with the beam failure recovery procedure while the first timer is running; and
detect that the first timer has expired in response to the obtained second set of indications.

12. An apparatus for wireless communication, comprising:
means for obtaining a first set of indications associated with a beam failure recovery procedure;
means for starting at least one of a first timer or a second timer based on the obtained first set of indications, wherein at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure; and
means for detecting a radio link failure when the first timer expires or when the second timer expires.

13. A non-transitory computer-readable medium storing computer-executable code, comprising code for causing a computer to:
obtain a first set of indications associated with a beam failure recovery procedure;
start at least one of a first timer or a second timer based on the obtained first set of indications, wherein at least one of the first timer or the second timer is started when N out-of-sync indications are obtained over a network configured time window, the N out-of-sync indications including aperiodic out-of-sync indications from the first set of indications and out-of-sync indications associated with a radio link monitoring procedure; and
detect a radio link failure when the first timer expires or when the second timer expires.

14. A method of wireless communication operable at a scheduled entity, the method comprising:
obtaining a first set of indications associated with a beam failure recovery procedure;
starting at least one of a first timer or a second timer based on the obtained first set of indications, wherein a time period of the second timer is less than a time period of the first timer, wherein the first set of indications includes a single aperiodic out-of-sync indication, and wherein at least the second timer is started when the single aperiodic out-of-sync indication is obtained; and
detecting a radio link failure when the first timer expires or when the second timer expires.

15. The method of claim 14, wherein the second timer expires prior to the first timer.

16. The method of claim 14, wherein the time period of the second timer is approximately 0 milliseconds.

17. The method of claim 14, further comprising:
obtaining a second set of indications associated with the beam failure recovery procedure while the first timer is running; and
stopping the first timer in response to the obtained second set of indications.

18. An apparatus for wireless communication, comprising:
at least one processor;
a transceiver communicatively coupled to the at least one processor; and
a memory communicatively coupled to the at least one processor,
wherein the at least one processor is configured to:
obtain a first set of indications associated with a beam failure recovery procedure;
start at least one of a first timer or a second timer based on the obtained first set of indications, wherein a time period of the second timer is less than a time period of the first timer, wherein the first set of indications includes a single aperiodic out-of-sync indication, and wherein at least the second timer is started when the single aperiodic out-of-sync indication is obtained; and
detect a radio link failure when the first timer expires or when the second timer expires.

19. The apparatus of claim 18, further comprising:
obtaining a second set of indications associated with the beam failure recovery procedure while the first timer is running; and
stopping the first timer in response to the obtained second set of indications.

20. A method of wireless communication operable at a scheduled entity, the method comprising:
obtaining a first set of indications associated with a beam failure recovery procedure;
starting at least one of a first timer or a second timer based on the obtained first set of indications, wherein at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure; and
detecting a radio link failure when the first timer expires or when the second timer expires.

21. The method of claim 20, wherein the N out-of-sync indications are non-consecutive.

22. The method of claim 20, further comprising:
obtaining a second set of indications associated with the beam failure recovery procedure while the first timer is running; and
stopping the first timer in response to the obtained second set of indications.

23. An apparatus for wireless communication, comprising:
at least one processor;
a transceiver communicatively coupled to the at least one processor; and
a memory communicatively coupled to the at least one processor,
wherein the at least one processor is configured to:
obtain a first set of indications associated with a beam failure recovery procedure;
start at least one of a first timer or a second timer based on the obtained first set of indications, wherein at least one of the first timer or the second timer is started when N out-of-sync indications are obtained out of K indications obtained from lower protocol layers, the N out-of-sync indications including aperiodic out-of-sync indications from the first set of indications and out-of-sync indications associated with a radio link monitoring procedure; and
detect a radio link failure when the first timer expires or when the second timer expires.

24. The apparatus of claim 23, wherein the at least one processor is further configured to:
obtain a second set of indications associated with the beam failure recovery procedure while the first timer is running; and
stop the first timer in response to the obtained second set of indications.

25. A method of wireless communication operable at a scheduled entity, the method comprising:
obtaining a first set of indications associated with a beam failure recovery procedure;
starting at least one of a first timer or a second timer based on the obtained first set of indications, wherein at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure; and
detecting a radio link failure when the first timer expires or when the second timer expires.

26. The method of claim 25, wherein each of the out-of-sync indications associated with a radio link monitoring procedure carries a same weight as each of the aperiodic out-of-sync indications from the first set of indications.

27. The method of claim 25, wherein each of the out-of-sync indications associated with a radio link monitoring procedure carries a different weight in relation to each of the aperiodic out-of-sync indications from the first set of indications.

28. The method of claim 25, further comprising:
obtaining a second set of indications associated with the beam failure recovery procedure while the first timer is running; and
stopping the first timer in response to the obtained second set of indications.

29. An apparatus for wireless communication, comprising:
at least one processor;
a transceiver communicatively coupled to the at least one processor; and
a memory communicatively coupled to the at least one processor,
wherein the at least one processor is configured to:
obtain a first set of indications associated with a beam failure recovery procedure;
start at least one of a first timer or a second timer based on the obtained first set of indications, wherein at least one of the first timer or the second timer is started when N consecutive out-of-sync indications are obtained, the N consecutive out-of-sync indications including aperiodic out-of-sync indications from the first set of indications and out-of-sync indications associated with a radio link monitoring procedure; and
detect a radio link failure when the first timer expires or when the second timer expires.

30. A method of wireless communication operable at a scheduled entity, the method comprising:
obtaining a first set of indications associated with a beam failure recovery procedure;
starting at least one of a first timer or a second timer based on the obtained first set of indications;
obtaining a second set of indications associated with the beam failure recovery procedure while the first timer is running;
reducing a time period of the first timer in response to the obtained second set of indications; and
detecting a radio link failure when the first timer expires or when the second timer expires.

31. An apparatus for wireless communication, comprising:
at least one processor;
a transceiver communicatively coupled to the at least one processor; and
a memory communicatively coupled to the at least one processor, wherein the at least one processor is configured to:
obtain a first set of indications associated with a beam failure recovery procedure;
start at least one of a first timer or a second timer based on the obtained first set of indications;
obtain a second set of indications associated with the beam failure recovery procedure while the first timer is running;
reduce a time period of the first timer in response to the obtained second set of indications; and
detect a radio link failure when the first timer expires or when the second timer expires.

32. A method of wireless communication operable at a scheduled entity, the method comprising:
obtaining a first set of indications associated with a beam failure recovery procedure;
starting at least one of a first timer or a second timer based on the obtained first set of indications;
obtaining a second set of indications associated with a radio link monitoring procedure while the first and second timers are running;
stopping the first and second timers in response to the obtained second set of indications; and
detecting a radio link failure when the first timer expires or when the second timer expires.

33. An apparatus for wireless communication, comprising:
at least one processor;
a transceiver communicatively coupled to the at least one processor; and
a memory communicatively coupled to the at least one processor,
wherein the at least one processor is configured to:
obtain a first set of indications associated with a beam failure recovery procedure;
start at least one of a first timer or a second timer based on the obtained first set of indications;
obtain a second set of indications associated with a radio link monitoring procedure while the first and second timers are running;
stop the first and second timers in response to the obtained second set of indications; and
detect a radio link failure when the first timer expires or when the second timer expires.

* * * * *